United States Patent
Raslambekov

(10) Patent No.: US 11,351,011 B1
(45) Date of Patent: Jun. 7, 2022

(54) METHODS AND SYSTEMS FOR DETERMINING TOOTH STRUCTURE

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/337,644

(22) Filed: Jun. 3, 2021

(51) Int. Cl.
| | |
|---|---|
| *A61C 7/00* | (2006.01) |
| *G06T 7/149* | (2017.01) |
| *G06T 19/20* | (2011.01) |
| *G06T 3/40* | (2006.01) |

(52) U.S. Cl.
CPC ............... *A61C 7/002* (2013.01); *G06T 3/40* (2013.01); *G06T 7/149* (2017.01); *G06T 19/20* (2013.01); *G06T 2207/30036* (2013.01)

(58) Field of Classification Search
CPC ........... A61C 7/00; A61C 7/146; A61C 7/002; A61C 9/004; A61C 13/0004
USPC ......................................................... 433/24
See application file for complete search history.

(56) References Cited

U.S. PATENT DOCUMENTS

| | | | |
|---|---|---|---|
| 6,049,743 A | 4/2000 | Baba | |
| 6,694,212 B1 | 2/2004 | Kennedy | |
| 6,790,035 B2 | 9/2004 | Tricca et al. | |
| 7,247,021 B2 | 7/2007 | Jones et al. | |
| 7,729,794 B2 | 6/2010 | Maier et al. | |
| 8,401,826 B2 | 3/2013 | Cheng et al. | |
| 9,179,988 B2 | 11/2015 | Dumitrescu et al. | |
| 10,695,147 B1 | 6/2020 | Raslambekov | |
| 10,706,184 B2 | 7/2020 | Fisker et al. | |
| 10,856,954 B1 | 12/2020 | Raslambekov | |
| 10,950,061 B1 | 3/2021 | Raslambekov | |
| 10,993,782 B1 | 5/2021 | Raslambekov | |
| 2002/0015934 A1* | 2/2002 | Rubbert | G06T 17/00 433/29 |
| 2008/0077270 A1* | 3/2008 | Maier | A61C 13/0004 700/163 |
| 2008/0124679 A1 | 5/2008 | Orth et al. | |
| 2008/0154419 A1* | 6/2008 | Cheng | G06T 7/60 700/118 |

OTHER PUBLICATIONS

U.S. Appl. No. 17/143,067, filed Jan. 6, 2021.

* cited by examiner

*Primary Examiner* — Gordon G Liu
(74) *Attorney, Agent, or Firm* — BCF LLP

(57) ABSTRACT

Methods, systems, and apparatuses are described for generating a digital model of a tooth structure for a gap between neighboring teeth of an arch form of a patient. Position of a tooth structure between neighboring teeth may be determined. Arch lines extending through the plurality of teeth may be determined. Intermediate points in the interdental gap may be determined. Longitudinal axis of the tooth structure relative to the neighbouring teeth may be derived. A digital model of the tooth structure may be aligned on the longitudinal axis and a digital model of the tooth structure may be obtained.

20 Claims, 13 Drawing Sheets

METHODS AND SYSTEMS FOR DETERMINING TOOTH STRUCTURE

FIELD

The present technology relates to tooth structure, such as, but not limited to, determining digital models of tooth structure for their manufacture or their use in planning orthodontic treatment.

BACKGROUND

In the field of orthodontics, sometimes patients present missing or incomplete tooth structures such as missing an entire tooth or missing a portion of a tooth such as the crown portion or the root portion. To file or replace the missing or incomplete tooth structure, artificial tooth structures can be used. Tooth structures may be tooth replicates that are attached to dentures, such as a suspended portion of a fixed partial denture, or a standalone implant. Tooth structures may also be used to replace a retinated tooth, a baby tooth, an implant, an implant with a crown, and/or a restored tooth or crown.

In addition, sometimes patients present one or more gaps between teeth. Such gaps may result from: one or more teeth that have been previously extracted leaving a gap between teeth, or through movement of teeth during an orthodontic treatment. In some instances, such gaps may also be naturally existing spaces in between the patient's teeth. A tooth structure may be used to fill the gap. In some instances such tooth structure is a pontic. Pontics may be tooth replicates that are attached to dentures, such as a suspended portion of a fixed partial denture, or a standalone implant.

Typically, the tooth structure needs to be tailor-made for the patient in order to suit the size and shape of the gap, to match the look of neighboring teeth, and to not adversely affect the patient such as affecting a bite of the patient, a speech of the patient, or otherwise causing pain or irritation to the patient. Conventional methods for designing a tooth structure for a given gap in a mouth of a given patient are laborious, time intensive, and can yield unpredictable results in terms of affecting a bite or speech of the patient or causing pain and irritation.

Therefore, there is a need in the field of orthodontics to generate digital tooth structures which reduce or overcome the abovementioned problems.

SUMMARY

It is an object of the present technology to ameliorate at least some of the inconveniences and drawbacks present in the prior art.

Embodiments of the present technology have been developed based on the developers' appreciation that digital models of tooth structures, such as pontics, are useful for their manufacture thereof, as well as for their use in determining an orthodontic treatment plan for a patient. However, conventionally, creating a digital tooth structure for a gap in a mouth of a given subject requires a large amount of computational resources to create a digital model of the tooth structure having the appropriate dimensions to fit the gap. For example, in order to determine a relative positioning of the tooth structure to the neighboring teeth, conventionally it is required to individually determine a tooth axis for each of the neighboring teeth U.S. Pat. No. 7,729,794-B2, published on Mar. 27, 2008, assigned to Degudent GmbH, and entitled "Method for designing a connector" discloses a method for designing a connector between a first and a second element of a dental restoration, such as a connector between coping and coping, or coping and pontic, or pontic and pontic of a bridge, which is characterized by the steps of computing a (first) model of the first element and a (second) model of the second element, defining a connecting straight line between the first model and the second model, computing edge curves ($\gamma 0$, $\gamma 4$) on the first model and the second model, whereby the edge curves are defined by origins of surface normal vectors of the models, which satisfy boundary conditions relative to the connecting line, computing offset curves ($\gamma 1$, $\gamma 3$) on the first model and the second model from the first edge curves, and connecting the first edge curves and the offset curves of the first model and of the second model and computing the connector on the basis of the course of the connection between the curves.

U.S. Pat. No. 8,401,826-B2 published Jun. 26, 2008, entitled "System and method for three-dimensional digital pontics", and assigned to Align Technology, Inc., describes modeling pontics at successive treatment stages which includes: (1) calculating space measurements between first and second teeth by getting first and second tooth transformations at a treatment stage i; (2) applying the first and second tooth transformations to get positions of the first and second teeth at the stage i; (3) calculating a direction vector of the space measurements at the stage i; (4) calculating a reference plane using the direction vector as a normal; (5) determining whether the space is available for a pontic by measuring the distance from the closest point on each of the first and second teeth to the reference plane; (6) generating an original pontic geometry for a first treatment stage; and (7) generating pontic geometries at each successive stage by calculating deformation parameters based on the original pontic geometry and size characteristics of the space and of the first and second teeth at each stage.

U.S. Pat. No. 6,790,035-B2 published Jun. 27, 2002, entitled "Method and kits for forming pontics in polymeric shell aligners", and assigned to Align Technology, Inc., describes systems and methods forming a pontic in a polymeric shell dental appliance, including providing a polymeric shell dental appliance of the type which is removably placeable over a patient's dentition, said shell having a concave trough which conforms to the teeth when the appliance is placed over the dentition and a location in the trough corresponding to a missing tooth; and depositing a flexible, durably affixed material in the location to form the pontic.

Developers have developed methods and systems for generating a digital model of a pontic for positioning in the gap between two teeth of a patient that reduces and/or minimizes computational resources compared to prior art methods, and uses of such digital models for manufacture of the pontic and/or planning an orthodontic treatment. Systems and/or methods for generating a digital model of a pontic may be beneficial when planning an orthodontic treatment for the patient, using for example automated or semi-automated orthodontic treatment planning software.

According to one aspect, the present technology relates to a method for generating a digital model of a tooth structure for a gap between neighboring teeth of an arch form of a patient, the method executable by a processor of a computer system, the method comprising: obtaining a 3D digital model of the arch form of the patient, the arch form comprising a plurality of teeth including the neighboring teeth, wherein the 3D digital model represents an outer geometry of crown portions of the plurality of teeth; determining a positioning of a tooth structure to between the neighboring teeth, the determining the positioning of the tooth structure comprising: generating a first arch line and a second arch line extending transversely through the plurality of teeth of the arch form, the first arch line and the second arch line being vertically spaced from one another; for the first arch line, determining a first pair of intersection points of the first arch line with the neighboring teeth, the first pair of intersection points being oppositely facing; for the second arch line, determining a second pair of intersection points of the second arch line with the neighboring teeth, the second pair of intersection points being oppositely facing; identifying a first intermediate point in the gap between the first pair of intersection points, and identifying a second intermediate point in the gap between the second pair of intersection points, the first and second intermediate points being determined according to a predetermined rule, wherein a connection of the first intermediate point and the second intermediate point determine a desired position of a longitudinal axis of the tooth structure relative to the neighboring teeth; obtaining a digital model of the tooth structure from a database and positioning the digital model of the tooth structure between the neighboring teeth such that a longitudinal axis of the digital model of the tooth structure is aligned with the determined desired position of the longitudinal axis; and storing the digital model of the tooth structure in a memory of the computer system.

In certain embodiments, the method for generating a digital model of a tooth structure for a gap between neighboring teeth of an arch form of a patient further comprises displaying the digital model of the tooth structure positioned between the neighboring teeth of the 3D digital model of the arch form.

In certain embodiments, generating the first arch line comprises: for each tooth of the plurality of teeth of the arch form, obtaining a segmentation contour representing a boundary of the tooth and adjacent gingiva; for each tooth of the plurality of teeth of the arch form, determining an inner segmentation contour point within each given segmentation contour based on a predetermined rule; generating the first arch line based on the determined inner segmentation contour points of the plurality of teeth of the arch form.

In certain embodiments, generating the first arch line comprises generating a polynomial curve based on the determined inner segmentation contour points and a mathematical regression.

In certain embodiments, wherein the predetermined rule for determining the inner segmentation contour point comprises determining a central position within the segmentation contour of the given tooth, the segmentation contour and the central position lying on a common plane.

In certain embodiments, generating the second arch line comprises: for each tooth of the plurality of teeth of the arch form, determining an inner crown point within the crown portion of the given tooth based on a predetermined rule; generating the second arch line based on the determined inner crown points of the plurality of teeth of the arch form.

In certain embodiments, generating the second arch line comprises generating a polynomial curve based on the determined inner crown points and a mathematical regression.

In certain embodiments, wherein the predetermined rule for determining the inner crown point comprises determining a central position within the outer geometry of the given crown portion.

In certain embodiments, wherein the predetermined rule for determining the first and second intermediate points of the first and second pair of intersection points comprises determining a mid point between the first and second pair of intersection points, respectively.

In certain embodiments, wherein the mid point between the first pair of intersection points is along a straight line connecting the first pair of intersection points, and the mid point between the second pair of intersection points is along a straight line connecting the second pair of intersection points.

In certain embodiments, the method further comprises determining that the digital model of the tooth structure requires scaling if: an inner crown point of a tooth structure crown of the digital tooth structure is not aligned with an intersection of the second arch line and the desired position of the longitudinal axis, the inner crown point having been determined based on a predetermined rule.

In certain embodiments, the method further comprises determining that the digital model of the tooth structure requires scaling if: an inner segmentation contour point of the digital tooth structure is not aligned with an intersection of the first arch line and the desired position of the longitudinal axis, the inner segmentation contour point having been determined based on a predetermined rule.

In certain embodiments, wherein, if there is a determination that the digital model of the tooth structure requires scaling, the method further comprises scaling the digital model of the tooth structure by: re-sizing the tooth structure along one axis to map the inner crown point of the tooth structure with the intersection of the second arch line and the desired position of the longitudinal axis.

In certain embodiments, wherein, if there is a determination that the digital model of the tooth structure requires scaling, the method further comprises scaling the digital model of the tooth structure by: re-sizing the tooth structure along one axis to map the inner segmentation contour point of the tooth structure onto an intersection of the first arch line and the desired position of the longitudinal axis.

In certain embodiments, the method further comprises scaling the digital model of the tooth structure, the digital model of the tooth structure comprising a crown portion and a segmentation contour, the scaling comprising: re-sizing the tooth structure along a first axis to map an inner crown point of the tooth structure onto an intersection of the second arch line and the desired position of the longitudinal axis, the inner crown point having been determined based on a predetermined rule; re-sizing the tooth structure along a second axis to map an inner segmentation contour point of the tooth structure onto the first arch line and the desired position of the longitudinal axis, the inner segmentation contour point having been determined based on a predetermined rule.

In certain embodiments, the method further comprises: scaling the digital model of the tooth structure, the digital model of the tooth structure comprising a crown portion and a segmentation contour, the scaling comprising: re-sizing the tooth structure independently along two axes and mapping into the gap based on the first arch line, the second arch line and the desired position of the longitudinal axis, without taking into account longitudinal axes of the neighboring teeth; and storing the scaled digital model of the tooth structure in a memory of the computer system.

In certain embodiments, wherein before the determining the positioning of the tooth structure, the method comprises: determining a size of the gap between the neighboring teeth, and if the size of the gap is larger than a threshold size, identifying that the gap is of appropriate dimensions for the tooth structure gap, and causing the processor to trigger the determining the positioning of the tooth structure.

In certain embodiments, wherein the vertical spacing between the first arch line and the second arch line in a given tooth corresponds to a distance between the gum line and a central point in the crown portion of the given tooth.

In certain embodiments, the vertical spacing between the first arch line and the second arch line in the given tooth corresponds to a distance between the gum line and a central point in the crown portion of the given tooth.

In certain embodiments, the digital model of the tooth structure is based on a 3D digital model of a tooth of the patient.

In certain embodiments, the digital model of the tooth structure is obtained from a digital library of tooth structures (e.g., database).

In certain embodiments, the method of the present technology further comprises developing an orthodontic treatment plan in accordance with the digital model of the tooth structure positioned between the neighboring teeth of the arch form.

In certain embodiments, the method of the present technology comprises developing the orthodontic treatment plan comprises adjusting the gap between teeth representations in a 3D digital model of the teeth and positioning the digital model of the tooth structure in the gap between teeth if the gap has a dimension which is more than a predetermined dimension.

According to another aspect, the present technology relates to a system for generating a digital model of a tooth structure for a gap between neighboring teeth of an arch form of a patient, the system comprising a computer system having a processor, the processor configured to execute a method comprising: obtaining a 3D digital model of the arch form of the patient, the arch form comprising a plurality of teeth including the neighboring teeth, wherein the 3D digital model represents an outer geometry of crown portions of the plurality of teeth; determining a positioning of a tooth structure in the gap between the neighboring teeth, the determining the positioning of the tooth structure comprising: generating a first arch line and a second arch line extending transversely through the plurality of teeth of the arch form, the first arch line and the second arch line being vertically spaced from one another; for the first arch line, determining a first pair of intersection points of the first arch line with the neighboring teeth, the first pair of intersection points being oppositely facing; for the second arch line, determining a second pair of intersection points of the second arch line with the neighboring teeth, the second pair of intersection points being oppositely facing; identifying a first intermediate point in the gap between the first pair of intersection points, and identifying a second intermediate point in the gap between the second pair of intersection points, the first and second intermediate points being determined according to a predetermined rule, wherein a connection of the first intermediate point and the second intermediate point determine a desired position of a longitudinal axis of the tooth structure relative to the neighboring teeth; and obtaining a digital model of the tooth structure from a database and positioning the digital model of the tooth structure between the neighboring teeth such that a longitudinal axis of the digital model is aligned with the determined desired position of the longitudinal axis.

In certain embodiments, the processor is configured to scale the digital model of the tooth structure, the digital model of the tooth structure comprising a tooth structure crown and a tooth structure segmentation contour, the scaling comprising: re-sizing the tooth structure independently along two axes and mapping into the gap based on the first arch line, the second arch line and the desired position of the longitudinal axis, without taking into account longitudinal axes of the neighboring teeth.

In certain embodiments, the first arch line is generated based on inner segmentation contour points of the plurality of teeth of the arch form, each inner segmentation contour point of each tooth of the plurality of teeth being a central point within a segmentation contour representing a boundary of the tooth and adjacent gingiva, and the second arch line is generated based on inner crown points of the plurality of teeth of the arch form, each inner crown point of each tooth of the plurality of teeth being a central point within the crown portion of the given tooth.

According to a further aspect, the present technology relates to a method for generating a digital model of a tooth structure for a gap between neighboring teeth of an arch form of a patient, the method executable by a processor of a computer system, the method comprising: obtaining a 3D digital model of the arch form of the patient, the arch form comprising a plurality of teeth including the neighboring teeth, wherein the 3D digital model represents an outer geometry of crown portions of the plurality of teeth; obtaining a desired position for the tooth structure, the desired position comprising a desired position of a longitudinal axis of the tooth structure in between the neighboring teeth; obtaining a digital model of the tooth structure from a database and positioning the digital model of the tooth structure between the neighboring teeth such that a longitudinal axis of the digital model is aligned with the obtained desired position of the longitudinal axis; scaling the digital model of the tooth structure, the digital model of the tooth structure comprising a tooth structure crown and a tooth structure segmentation contour, the scaling comprising: re-sizing the tooth structure independently along two axes, the scaling being based on aligning a reference point of the tooth structure with one or more of a first arch line, a second arch line and the desired position of the longitudinal axis, wherein the first arch line and the second arch line extend transversely through the plurality of teeth of the arch form including the neighboring teeth; and storing the scaled digital model of the tooth structure in a memory of the computer system.

According to a yet further aspect, the present technology relates to a system for generating a digital model of a tooth structure for a gap between neighboring teeth of an arch form of a patient, the system comprising a processor of a computer system, the processor being configured to execute a method comprising: obtaining a 3D digital model of the arch form of the patient, the arch form comprising a plurality of teeth including the neighboring teeth, wherein the 3D digital model represents an outer geometry of crown portions of the plurality of teeth; obtaining a desired position for the tooth structure, the desired position comprising a desired position of a longitudinal axis of the tooth structure in between the neighboring teeth; obtaining a digital model of the tooth structure from a database and positioning the digital model of the tooth structure between the neighboring teeth such that a longitudinal axis of the digital model is aligned with the obtained desired position of the longitudinal axis; scaling the digital model of the tooth structure, the digital model of the tooth structure comprising a tooth structure crown and a tooth structure segmentation contour, the scaling comprising: re-sizing the tooth structure independently along two axes, the scaling being based on aligning a reference point of the tooth structure with one or more of a first arch line, a second arch line and the desired position of the longitudinal axis, wherein the first arch line and the second arch line extend transversely through the plurality of teeth of the arch form including the neighboring teeth; and storing the scaled digital model of the tooth structure in a memory of the computer system.

In certain embodiments, the system further comprises a manufacturing system, the processor being configured to cause the manufacturing system to manufacture the tooth structure based on the scaled digital model of the tooth structure.

In certain embodiments, wherein before obtaining a desired position for the tooth structure, the processor is configured to determine a size of the gap between the neighboring teeth, and if the size of the gap is larger than a threshold size, identify that the gap is associated with a missing tooth, and cause the triggering of the determining the positioning of the tooth structure.

In certain embodiments, the processor is configured to generate the first arch line by obtaining, for each tooth of the plurality of teeth of the arch form, a segmentation contour representing a boundary of the tooth and adjacent gingiva; determine, for each tooth of the plurality of teeth of the arch form, an inner segmentation contour point within each given segmentation contour based on a predetermined rule; and generate the first arch line based on the determined inner segmentation contour points of the plurality of teeth of the arch form.

In certain embodiments, the processor is configured to generate the first arch line by generating a polynomial curve based on the determined inner segmentation contour points and a mathematical regression.

In certain embodiments, the predetermined rule for determining the inner segmentation contour point comprises determining a central position within the segmentation contour of the given tooth, the segmentation contour and the central position lying on a common plane.

In certain embodiments, the processor is configured to generate the second arch line by determining, for each tooth of the plurality of teeth of the arch form, an inner crown point within the crown portion of the given tooth based on a predetermined rule; and generating the second arch line based on the determined inner crown points of the plurality of teeth of the arch form.

In certain embodiments, the processor is configured to generate the second arch line by generating a polynomial curve based on the determined inner crown points and a mathematical regression.

In certain embodiments, the predetermined rule for determining the inner crown point comprises determining a central position within the outer geometry of the given crown portion.

In certain embodiments, the predetermined rule for determining the first and second intermediate points of the first and second pair of intersection points comprises determining a mid point between the first and second pair of intersection points, respectively.

In certain embodiments, the mid point between the first pair of intersection points is along a straight line connecting the first pair of intersection points, and the mid point between the second pair of intersection points is along a straight line connecting the second pair of intersection points.

In certain embodiments, the processor is configured to develop an orthodontic treatment plan using the determined digital model of the tooth structure.

In certain embodiments, the developing the orthodontic treatment plan comprises the processor being configured to adjust a gap between the neighboring teeth in the 3D digital model of the teeth and position the digital model of the tooth structure in the gap if the gap is more than a predetermined dimension.

In certain embodiments of any of the abovementioned aspects, the tooth structure is a pontic.

The methods, systems, and apparatuses described herein may allow a practitioner to create a digital tooth structure for treating a patient. The digital tooth structure may be used to update the 3D digital model of the arch form of the patient, and further used in orthodontic treatment planning. In some instances, the digital tooth structure may be used to create and manufacture an actual physical tooth structure, such as by additive manufacturing, molding or in any other suitable manner.

In some non-limiting embodiments of any of the above aspects, axes of the neighboring teeth are not determined and/or not taken into consideration in the step of positioning and/or scaling the obtained digital model of the tooth structure. That is to say that in some embodiments, methods and systems of the present technology do not account for axes of teeth neighboring the interdental gap.

Not having to determine and/or take into consideration the axes of neighbouring teeth can present, in certain embodiments, a leaner resource requirement of determining the digital tooth structure model compared to techniques currently known in the art in which axes of neighbouring teeth need to be determined before determining a required position and/or size of the tooth structure. Such reduction in computer processing for generating a tooth structure digital model can result in a faster time to generate the digital tooth structure, and as a consequence to manufacture the tooth structure and/or plan an orthodontic treatment using the digital model of the tooth structure.

In the context of the present specification, the expression "interdental gap" or "gap" refers to a space between a given pair of adjacent teeth. More specifically, a given interdental gap may extend from a distal surface of one of the given pair of adjacent teeth to a mesial surface of another one of the given pair of adjacent teeth filling in the interdental gap therebetween. The term "interdental gap" or "gap" also refers to situations in which a given gap is delimited by other structures on either side, such as a gum of the patient, an artificial tooth, etc.

Further, in the context of the present specification, the term "tooth axis" of the given tooth is referred to as a virtual line extending through the given tooth lengthwise, through a crown portion and a root portion thereof. In certain embodiments, the tooth axis is positioned such that a mass of the given tooth as well as anatomical features (such as lobes, developmental grooves, and marginal ridges thereof, for example) thereof are distributed substantially symmetrically about the tooth axis. In other embodiments, the tooth axis may extend through a middle point of the crown portion and/or a middle point of the root portion.

In the context of the present specification, unless expressly provided otherwise, a computing device and/or computer system may refer, but is not limited to, an "electronic device," an "operation system," a "system," a "computer-based system," a "controller unit," a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned objects and/or aspects, but do not necessarily have all of them. It should be understood that some aspects of the present technology that have resulted from attempting to attain the above-mentioned object might not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION OF THE NON-LIMITING EMBODIMENTS

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

A 3D digital model of a patient's arch form may be generated based on images and/or scans of the patient's mouth, such as images and/or scans of the teeth and gingiva of the patient. The 3D digital model may comprise portions of teeth and gingiva. The 3D digital model may comprise a three-dimensional (3D) mesh, in which a plurality of vertices are connected to each other by edges. In some instances, the arch form, and hence the 3D digital model may have one or more interdental gaps between neighboring teeth.

Using the 3D digital model of the patient's arch form, a digital model of a tooth structure may be generated for a patient. The digital model of the tooth structure may be generated without needing to determine tooth axes of the neighboring teeth. The digital model of the tooth structure may be displayed to a user, such as a practitioner designing an orthodontic treatment for the patient or manufacturing an actual physical tooth structure. The digital model of the tooth structure may be superimposed on a display of the 3D mesh of the patient's arch form. The user may adjust various parameters of the digital model of the tooth structure, such as a size along one, two or three axes. The sizing along different axes may be performed independently. After adjusting the digital model of the tooth structure using the display, the user may cause an actual physical tooth structure to be produced based on the digital model of the tooth structure. The adjusting the parameters of the digital model of the tooth structure and/or causing the actual physical tooth structure to be produced may be caused automatically on certain triggers, instead of user triggered.

The digital model of the tooth structure may also be used to plan an orthodontic treatment for the patient, such as by taking into account the tooth structure when designing and manufacturing an orthodontic appliance to apply the orthodontic treatment.

Figure 1:
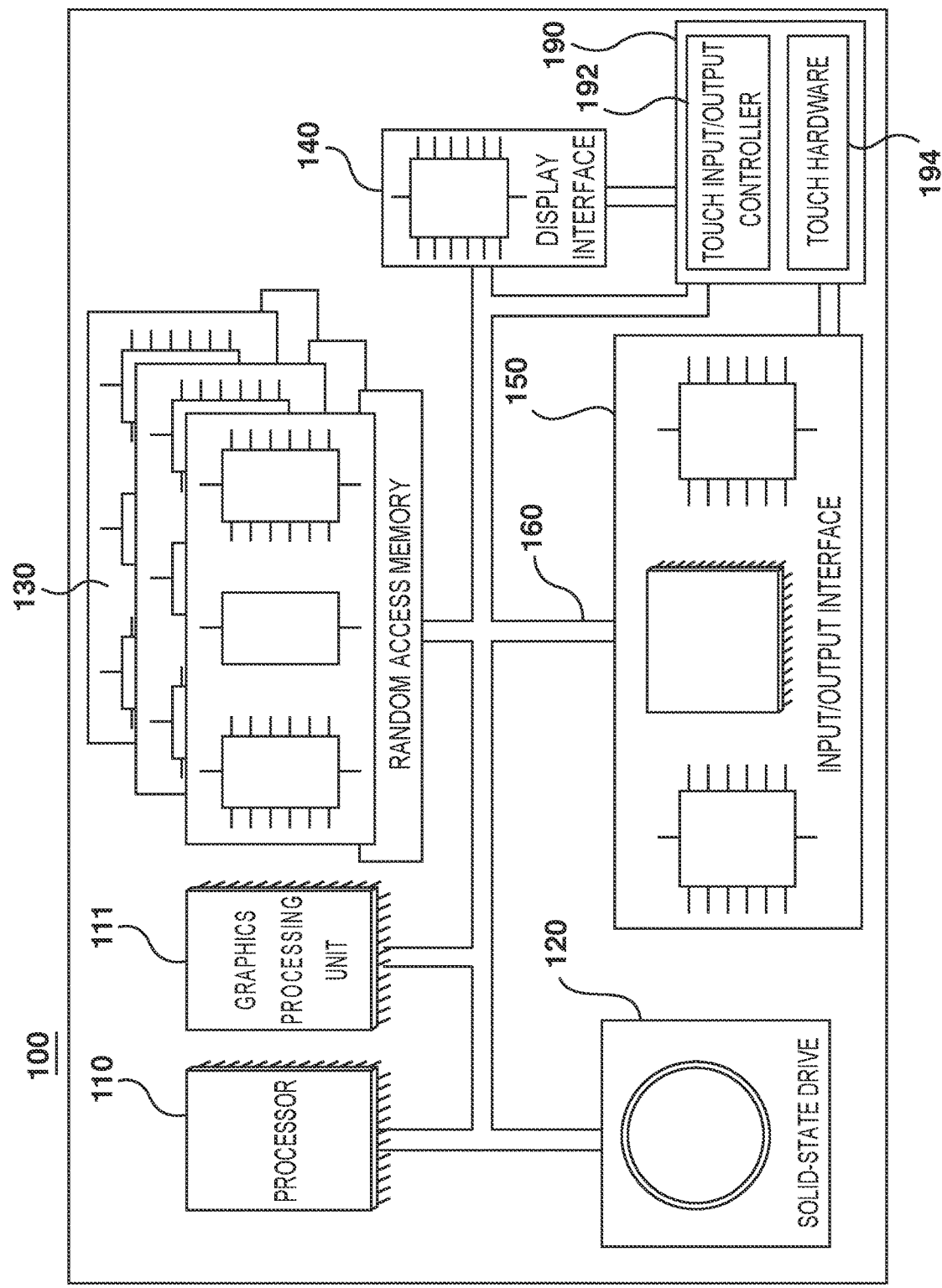
FIG. 1 depicts an example computer system that may be used to implement any of the methods and/or systems described herein, according to non-limiting embodiments of the present technology.

With reference to FIG. 1, there is shown a computer system 100 suitable for use with some implementations of the present technology. The computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random access memory 130, and an input/output interface 150. The computer system 100 may be a computer specifically designed to operate a machine learning algorithm (MLA). The computer system 100 may be a generic computer system.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may be hosted, at least partially, on a server. The computer system 100 may be partially or totally virtualized through a cloud architecture.

The computer system 100 may be specifically dedicated to the implementation of the present technology. For example, the computer system 100 may be implemented in an electronic device such as, but not limited to, a desktop computer/personal computer, a laptop, a mobile device, a smart phone, a tablet device, a server, specifically designed for managing orthodontic treatment, or for making orthodontic appliances for applying the orthodontic treatment. The computer system 100 may be configured to operate other devices, such as one or more imaging devices. As a person skilled in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid-state drive, hard disk drive, a magnetic disk drive, and/or an optical disk drive. The random access memory 130 and/or solid-state drive 120 may be configured in any known manner and arranged to store, among other data, one or more of: set-up data, subject data, subject medical records of one or more subjects, arch form image data of the one or more of the subjects, such as 3D arch form meshes, and/or orthodontic treatment data.

Communication between the various components of the computer system 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

It should be noted that the computer system 100 can be configured for receiving the image data from a vast range of devices. Some of such devices can be used for capturing and/or processing data pertaining to maxillofacial and/or cranial anatomy of the patient. In certain embodiments, the image data received from such devices is indicative of properties of anatomical structures of the patient, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth)

extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

Figure 2:
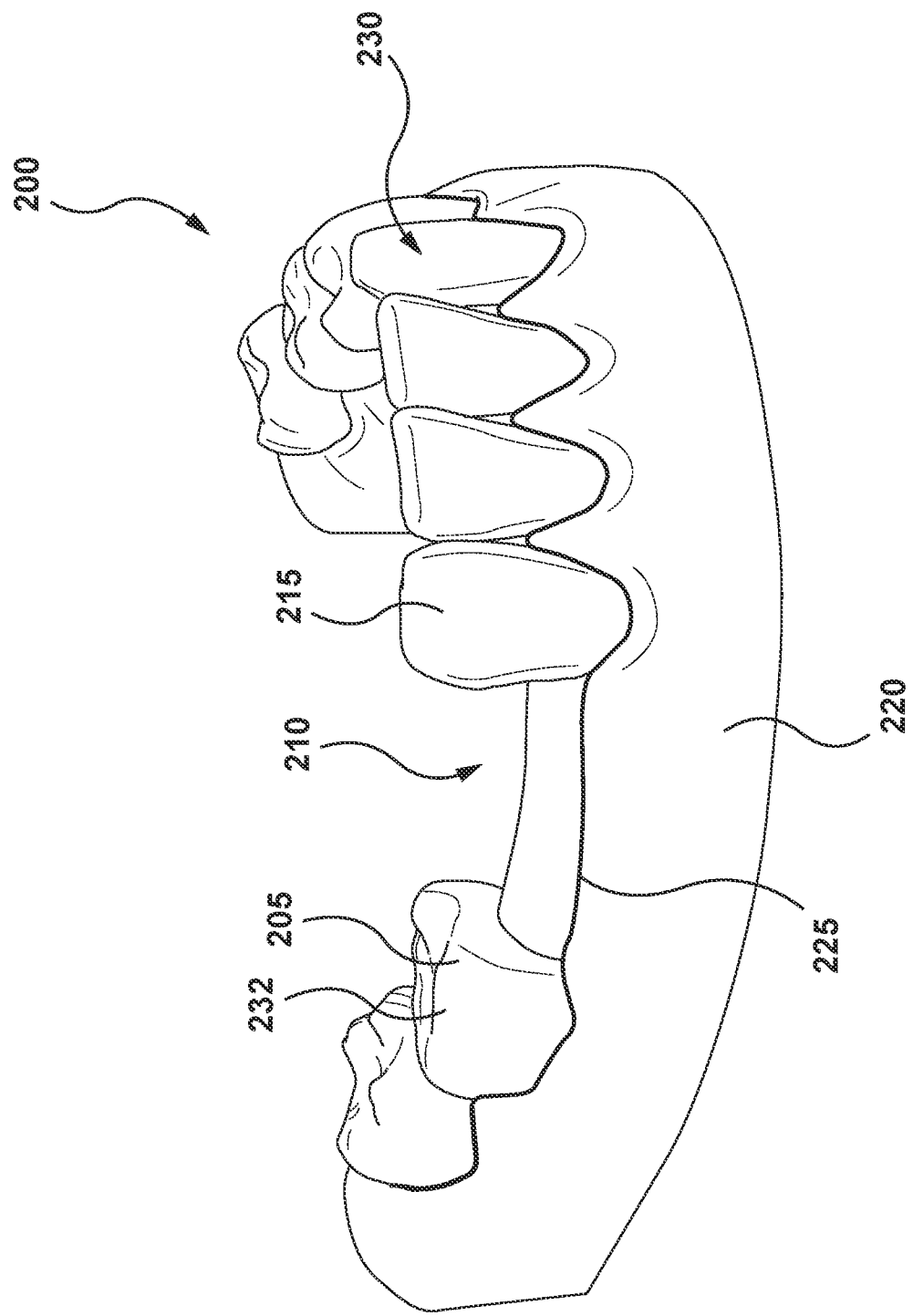
FIG. 2 depicts a perspective view of an example arch form of a patient to which methods and/or systems of the present technology may be applied. according to non-limiting embodiments of the present technology.
Figure 3:
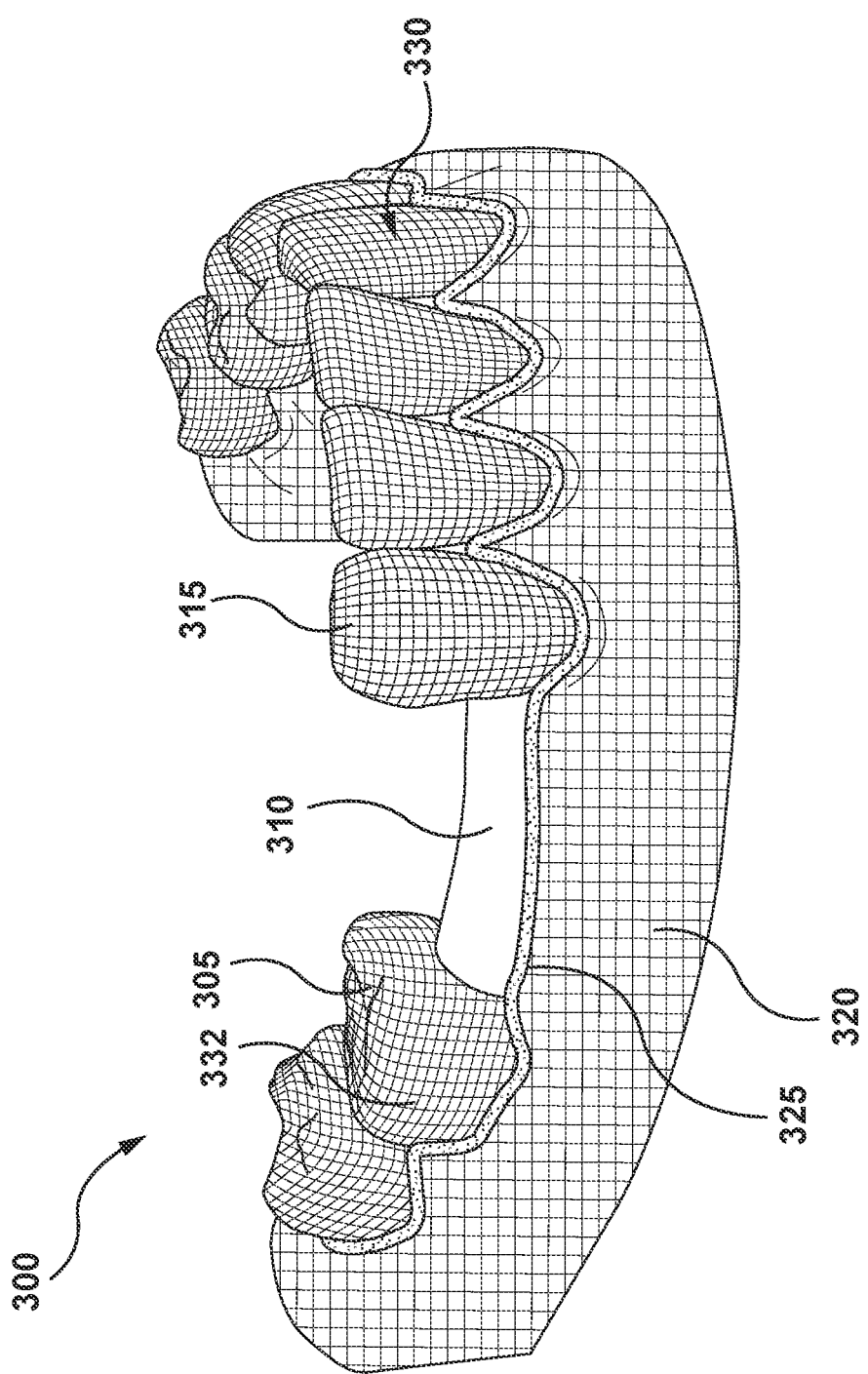
FIG. 3 depicts a 3D digital model of the arch form of FIG. 2, according to non-limiting embodiments of the present technology.

For example, in some non-limiting embodiments of the present technology, the computer system 100 may be configured to receive image data of the patient's arch form, such as an arch form 200 depicted in FIG. 2, and use a 3D digital model 300 of the arch form 200, such as shown in FIG. 3, to plan an orthodontic treatment preliminarily determined for the patient. In specific non-limiting embodiments of the present technology, the orthodontic treatment may be determined, for example, by the processor 110, as described in a co-owned U.S. patent application Ser. No. 17/014,107 filed on Sep. 8, 2020, and entitled "SYSTEMS AND METHODS FOR DETERMINING A TOOTH TRAJECTORY"; contents of which are hereby incorporated by reference in its entirety.

In alternative non-limiting embodiments of the present technology, the computer system 110 may be configured to receive the image data associated with the patient directly from an imaging device (not separately depicted) communicatively coupled with the processor 110. Broadly speaking, the processor 110 may be configured to cause the imaging device to capture and/or process the image data of the patient's teeth (such as teeth 230 depicted in FIG. 2) and periodontium (such as gingiva 220 in FIG. 2). In certain non-limiting embodiments of the present technology, the image data may include, for example, one or more of: (1) images of external surfaces of respective crown portions of the teeth 230, (2) images of an external surface of the periodontium including those of the patient's gingiva (such as the gingiva 220), the alveolar mandibular bone (not depicted), and images of superficial blood vessels and nerve pathways associated with the teeth 230; and (3) images of an oral region. Although the arch form 200 illustrates the lower part of the patient's mouth ("lower arch form"), it should be understood that the aspects and embodiments of the present technology may be applied to an upper arch form, or both upper and lower arch forms.

By doing so, the imaging device may be configured, for example, to capture image data of the arch form 200 associated with the patient. In another example, the imaging device may also be configured to capture and/or process image data of another arch form of the patient (not depicted) associated with the patient without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device may comprise a desktop scanner enabling to digitize a mold (not depicted) representing a desired configuration of the teeth 230. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In some embodiments, imaging data of the arch form 200 captured by the imaging device is in the form of a 3D digital model comprising, in certain embodiments, a mesh. FIG. 3 shows a 3D digital model of the arch form 200. In some instances, the 3D digital model of the arch form 200 may be configured as a cloud points or as any other possible modes of representation known in the art.

In a specific non-limiting example, the desktop scanner can be of one of the types available from Dental Wings, Inc. of 2251, ave Letourneux, Montréal (QC), Canada, H1V 2N9. It should be expressly understood that the desktop scanner can be implemented in any other suitable equipment.

Further, it is contemplated that the computer system 100 may be configured for processing of the received image data. The resulting image data of the patient's arch form 200 received by the computer system 110 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 110 may further comprise a corresponding computing environment.

As shown in FIG. 2, the teeth 230 of the arch form 200 comprise neighboring teeth: a first tooth 205 and a second tooth 215 defining an interdental gap 210 therebetween. The teeth 230 are separated from gingiva 220 by a gum line 225. In some instances, the interdental gap 210 is a space that is to be filled or completed with one or more tooth structures such as a pontic. Each tooth 230 comprises a crown portion 232.

The 3D digital model 300 of the arch form 200 (FIG. 3) comprises representations of the teeth 230, the first tooth 205, the second tooth 215, gingiva 220, interdental gap 210, gum line 225 and crown portions 232 as teeth 330, first tooth 305, second tooth 315, gingiva 320, interdental gap 310 and crown portions 332, respectively. The gum line 225 is represented in the 3D digital model 300 as a boundary 325.

The boundary 325 may be manually identified, or drawn, by a user (such as the dentist or the like) viewing the 3D digital model 300 of the arch form 200. In some non-limiting embodiments of the present technology, the processor 110 may be configured to determine the boundary 325 automatically from the 3D digital model 300. For example, the processor 110 may be configured to determine the boundary 325 using the methods and/or systems described in a co-owned U.S. Pat. No. 10,695,147-B1 issued on Jun. 30, 2020, entitled "METHOD AND SYSTEM FOR DENTAL BOUNDARY DETERMINATION", contents of which are incorporated herein by reference in their entirety.

According to certain non-limiting embodiments of the present technology, in order to determine the boundary 325, the processor 110 may be configured to: (i) receive the 3D digital model 300 of the arch form 200; (ii) define, for each tooth representation 330 of the teeth 230 of the 3D digital model 300, a plurality of curves, wherein each curve of the plurality of curves crosses the gum line 225; determine, for each point of a plurality of points of each of the plurality of curves, an indication of curvature of the respective curve at each point; determine, for each point of the plurality of points and based on the indication of curvature corresponding to the respective point, a predicted likelihood parameter that each point corresponds to the gum line 225 between the teeth 230 and the gingiva 220; and select, for each curve of the plurality of curves, using a smoothing function and the predicted likelihood parameter, a single point, of the plurality of points, on the respective curve as a boundary point corresponding to the boundary 325 between the teeth 330 and the gingiva 320 in the 3D digital model 300 3D digital model.

In some embodiments, the present technology provides a method and a system for generating a digital model of a tooth structure suitable for being positioned in an interdental gap, such as the interdental gap 210 of the arch form 200 between the first tooth 205 and the second tooth 215. In certain embodiments, the generating the digital model is based on a digital model of the arch form, such as the digital model 300.

In some embodiments of the present technology, the tooth structure is a pontic. In the context of the present specification, a pontic refers to an artificial tooth or artificial tooth structure that is used to simulate a tooth or part of a tooth of a patient. The pontic may be used to fill or complete a gap in a subject's jaw, such as for example to fill a gap present between teeth of a subject. Pontic may be, for example, a replacement of a missing or incomplete tooth or teeth. The pontic may be fabricated from any suitable biocompatible material, such as but not limited to, polymeric materials, cast metal, porcelain or combinations. In some instances, the pontic has a tooth morphology which matches that of neighboring teeth of the patient. The pontic may have a size and shape suited to meet the particular requirements of a given clinical situation. The pontic may comprise a representation of a crown portion of a regular, natural tooth.

In other embodiments, the tooth structure may comprise a tooth implant.

Figure 4:
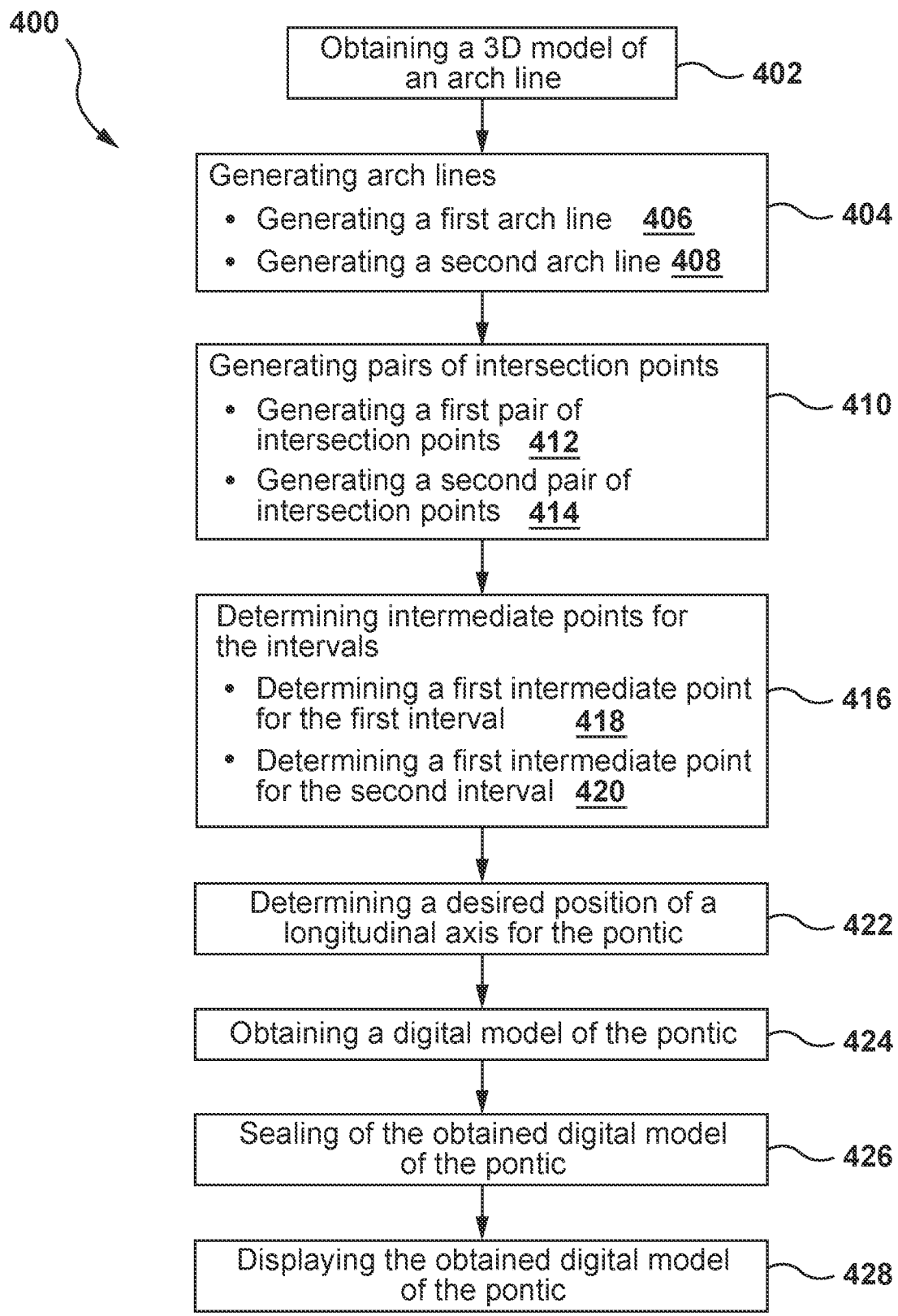
FIG. 4 shows an example of a flow diagram of a method for generating a digital model of a tooth structure using the 3D digital model of FIG. 3 and which may be performed by the computer system of FIG. 1 according to non-limiting embodiments of the present technology.

In some embodiments, the method is performed by the processor 110. FIG. 4 illustrates a flow diagram of a method 400 for generating a digital model of a tooth structure according to non-limiting embodiments of the present technology.

For ease of explanation, the method 400 and following figures describe the generation of a digital model of a single tooth structure for filling an interdental gap between two teeth. It should be understood that digital models of any number of tooth structures may be generated for a patient depending on a respective number of parameters such as the size of an interdental gap to be filled and the number of interdental gaps present in an arch form of a given patient. For example, the arch form may include several interdental gaps. Digital models of tooth structures may be generated for each interdental gap in the patient's arch form. The user may select the number of tooth structures required and hence the digital models required for those tooth structures. For example, the user may select two neighboring teeth on a user interface and request that a digital model of a tooth structure be generated for the interdental gap between the two selected teeth. In some other instances, for example, it may be that more than one digital model of tooth structures (e.g., 2 digital tooth structures) are selected for the same interdental gap. In such instances, the interdental gap is large enough to accommodate two tooth structures. In some instances, multiple tooth structures may be used for larger interdental gap. In such instances, the method comprises using statistical information about the average size of the teeth to determine how many of teeth can be accommodated into the gap.

The following description and related figures will refer to the generation of a tooth structure which is a pontic. However, it will be appreciated that embodiments of the present technology may equally apply to other types of artificial tooth structures such as implants, veneers or the like.

Step 402: Obtaining a 3D Digital Model of an Arch Form

At step 402, according to certain non-limiting embodiments of the present technology, the processor 110 may be configured to obtain a 3D digital model of an arch form of a patient, such as the 3D digital model 300 of the arch form 200. As mentioned above, the arch form 200 may comprise the teeth 230 and the gingiva 220 of the patient. The 3D digital model 300 of the arch form 200 represents an outer geometry of at least crown portions 232 of the plurality of teeth 230. The arch form 200 may include at least one interdental gap between neighbouring teeth in the 3D arch form, such as the interdental gap 210 between the first tooth 205 and the second tooth 215.

In some non-limiting embodiments of the present technology, the 3D digital model 300 of the arch form 200 may have a mesh configuration comprising vertices and/or edges connecting the vertices. The 3D digital model 300 may be received in any suitable format. In some instances, the 3D digital model 300 may have been generated based on scans, images, a mold of the patient's mouth, and/or any other data related to the patient. The 3D digital model 300 may include at least one interdental gap defined by two neighboring teeth in the 3D digital model, such as the interdental gap 310 between the first tooth 305 and the second tooth 315.

In some non-limiting embodiments, the method 400 is triggered by determining the size of the interdental gap 310 between the neighboring teeth 305, 315 and then comparing the size of the interdental gap 310 to a threshold value for the interdental gap 310. If the size of the interdental gap 310 is larger than the threshold value, the method 400 is triggered. If the interdental gap 310 is associated with a missing or incomplete tooth or missing teeth, the method 400 comprises initiating the steps that are defined hereinbelow to generate a digital model of a tooth structure to be positioned in the interdental gap 310. In some instances, if the size of the interdental gap 310 is smaller than the threshold, the method identifies that there is no need to generate a digital model of a tooth structure.

Step 404: Generating Arch Lines

At step 404, the processor 110 initiates steps to determine the positioning of the digital model of the tooth structure in the interdental gap 310. In some embodiments, determining the positioning of the digital model of the tooth structure includes generating a first arch line 602 and a second arch line 702 (Steps 406 and 408, respectively) that extend transversely through the plurality of teeth 330 of the 3D digital model 300 of the arch form 200. In some instances, the first arch line 602 and the second arch line 702 also extend transversally through the interdental gap 310 present in the arch form 200. In some instances, the first arch line 602 and the second arch line 702 are vertically spaced from one another.

Step 406: Generating a First Arch Line

Step 406 of determining the first arch line 602 comprises, in certain embodiments, the processor 110 determining a first reference point for one or more given teeth 601, (see FIGS. 5-6) such as from the 3D digital model 300 of the tooth 205 or the tooth 215 of the arch form 200 and determining the first arch line 602 (see FIG. 7) based on the determined first reference point(s).

Figure 5:
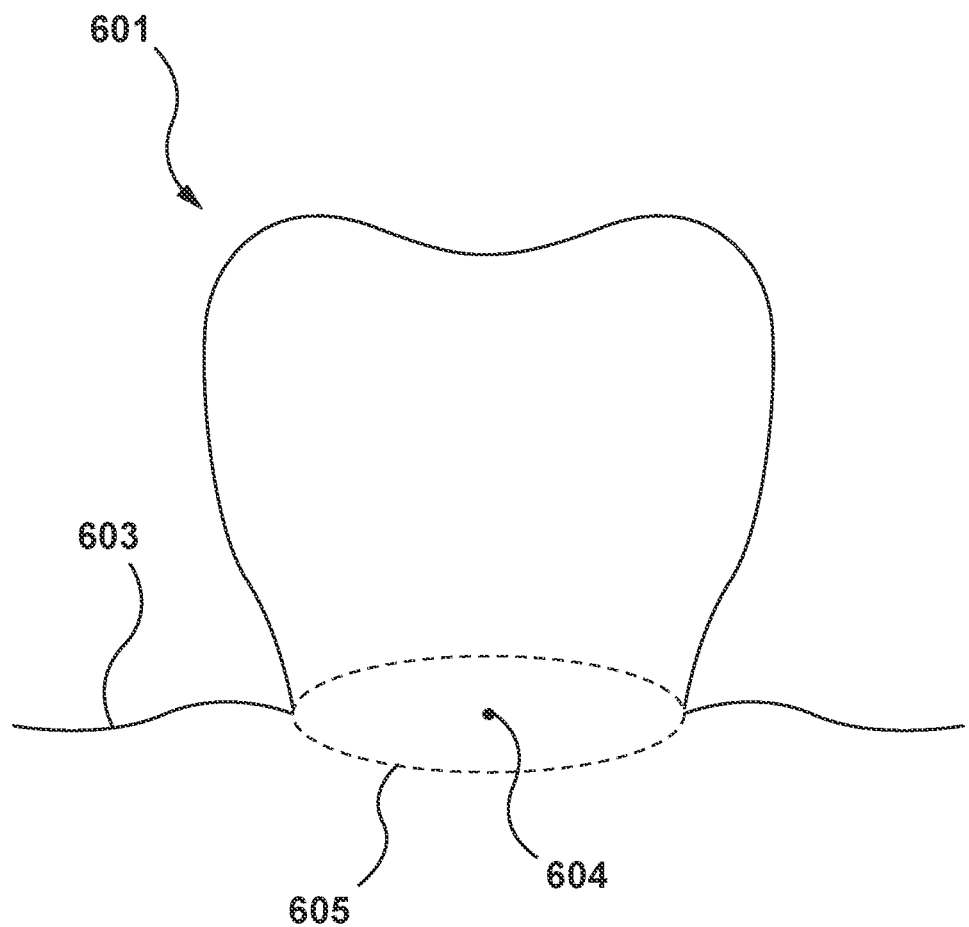
FIG. 5 shows an example of a segmentation contour and a determined inner segmentation contour point of a tooth such as one of the teeth of the 3D digital model of FIG. 3 according to non-limiting embodiments of the present technology.

As shown in FIG. 5, the first reference point of the given tooth 601 may comprise an inner segmentation contour point 604. In certain embodiments, the first reference point of all teeth 601 of the arch form 200 are determined from the 3D digital model 300. In certain embodiments, the first reference point of only some of the teeth 601 of the arch form 200 are determined from the 3D digital model 300.

The inner segmentation contour point 604 may comprise a point within a segmentation contour 605 of the tooth 601, the segmentation contour 605 comprising a circumferential loop around the tooth 601 at the interface of the tooth 601 and the adjacent gingiva 603. The segmentation contour 605 represents an interface of the tooth 601 with the gingiva 603, such as the boundary 325 separating the teeth 330 and gingiva 320 representations in the 3D digital model 300.

Figure 6:
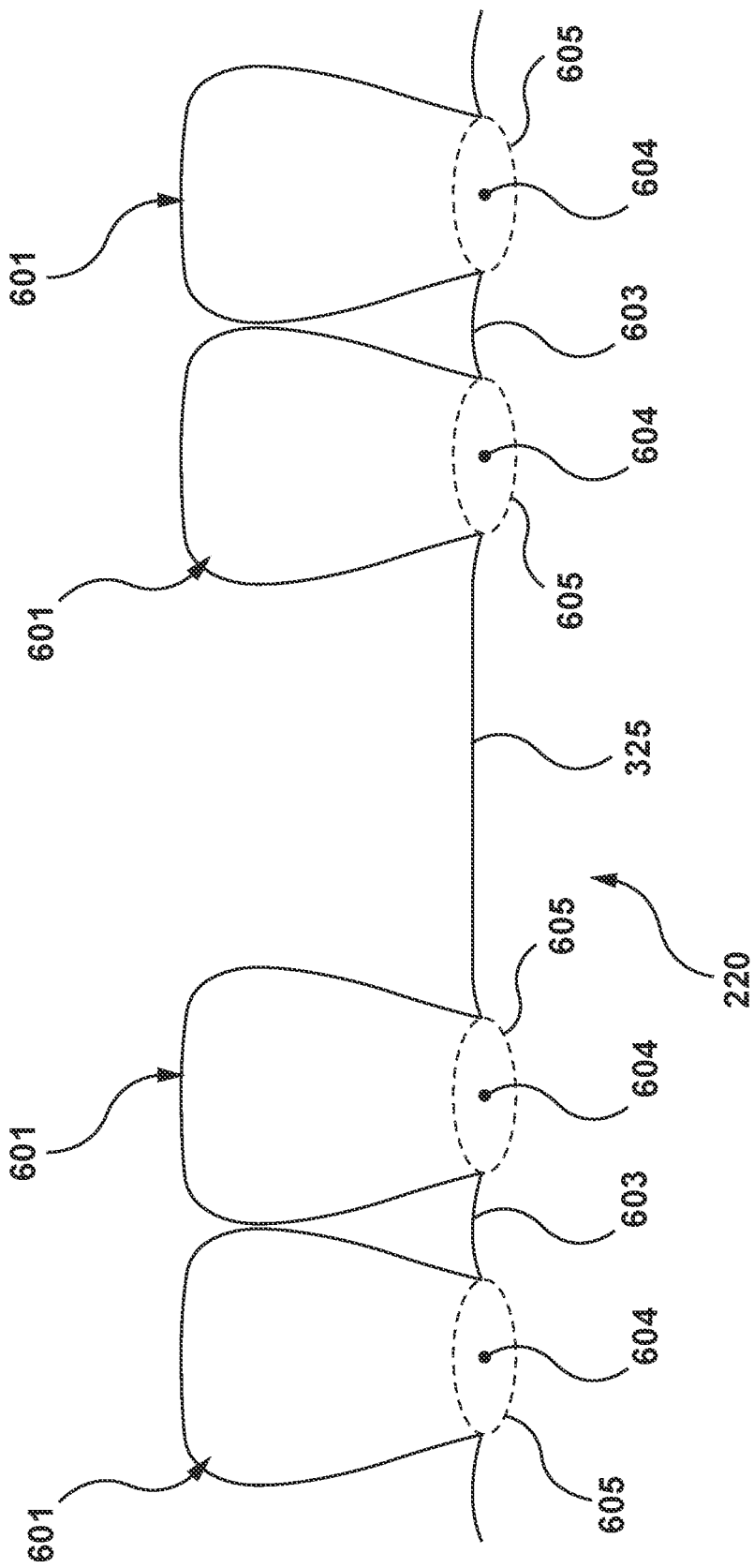
FIG. 6 depicts a portion of the 3D digital model of FIG. 3 and including the inner segmentation contour points of the teeth as shown in FIG. 5 according to non-limiting embodiments of the present technology.
Figure 7:
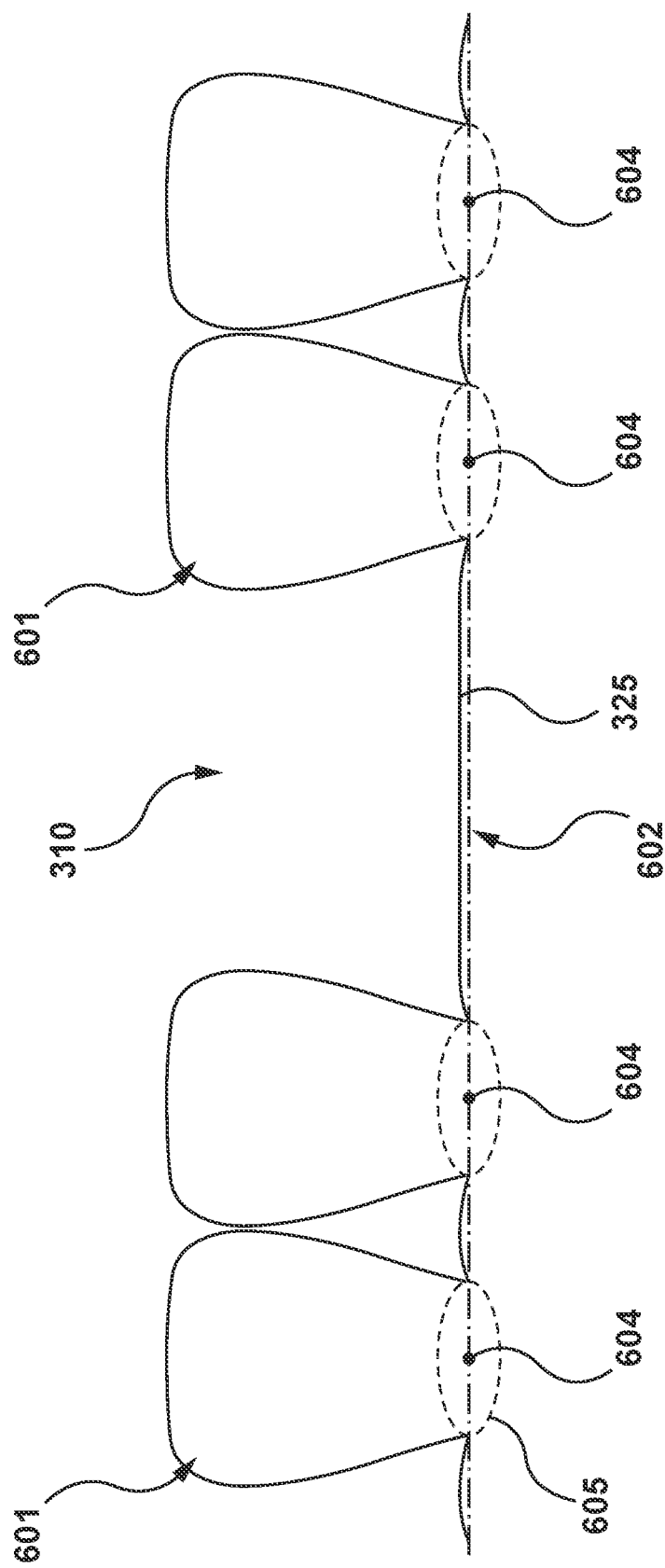
FIG. 7 depicts the 3D digital model of FIG. 6 and including a determined first arch line according to non-limiting embodiments of the present technology.

The inner segmentation contour point 604 may be a central point within the segmentation contour 605 of the tooth 601, or be based on any other predetermined rule or position relative to the segmentation contour 605 of the tooth 601. As shown in FIGS. 6-7, in certain embodiments the inner segmentation contour point 604 of the tooth 601, such as the tooth 305 of the 3D digital model 300 is in a central position within the segmentation contour 605. The inner segmentation contour point 604 may be referred to as an inner segmentation contour center 604.

In certain embodiments, the segmentation contour 605 lies on a single plane extending through the tooth 601, in which case the inner segmentation contour point 604 is on the same plane as the segmentation contour 605.

In certain other embodiments, the segmentation contour 605 does not lie on a single plane, in which case the inner segmentation contour point 604 is determined taking into account the segmentation contour 605 in three dimensions. In some embodiments, the inner segmentation contour point 604 is obtained by determining for each of the tooth 330 in the 3D digital model 300, a middle point between an opposing pair of segmentation contour points and building a second order Bezier curve through the middle points. For areas where there are no determined middle points such as in the case of the last tooth in the arch form 200 or where there is a missing or incomplete tooth or missing teeth in the arch form 200, the Bezier curve is continued by mimicking the curvature of the curve. The middle point may be considered in 3D or in 2D.

In certain embodiments, the inner segmentation contour point 604 may be determined according to methods and/or systems described in co-owned U.S. Pat. No. 10,950,061 issued on Mar. 16, 2021 and entitled "SYSTEMS AND METHODS FOR PLANNING AN ORTHODONTIC TREATMENT", the contents of which are herein incorporated by reference in their entirety. Briefly, the processor 110 may be configured to identify, for each one of a plurality of segmentation contours for the teeth 330 of the 3D digital model 300, a point thereof that is closest to an adjacent segmentation contour. The processor 110 may also be configured to identify, on the adjacent segmentation contour, a second closest point, which is closest to the given segmentation contour (in other words, to the first closest point). The inner segmentation point 604 may thus be determined based on a midpoint between the first closest point and the second closest point, or a midpoint lying on a Bezier curve connecting the first and second closest points.

In certain embodiments, the method 400 at step 406 may comprise the processor 110 segmenting, in the 3D digital model 300, one or more crown portions 332 of the teeth 330 from one or more other crown portions 332 to identify and isolate individual teeth 330, such as the tooth 601 of FIG. 6.

In certain embodiments, the method 400 may comprise the processor 110, in the 3D digital model 300, segmenting one or more teeth 330 from surrounding gingiva 320 to determine the segmentation contour 605 of the one or more teeth. In certain embodiments, the method 400 for determining the segmentation contour 605 of a given tooth, such as the given tooth 601, is according to methods and systems described in co-owned U.S. Pat. No. 10,695,147-B1 issued on Jun. 30, 2020, entitled "METHOD AND SYSTEM FOR DENTAL BOUNDARY DETERMINATION", the contents of which are herein incorporated by reference in their entirety. In certain embodiments, the method 400 comprises the processor 110 obtaining the segmentation contour 605 for the given tooth, such as from the memory 130 of the computer system 100.

From the identified inner segmentation contour points 604 of the one or more of the teeth 330, such as the teeth 601 depicted in FIG. 7, the method 400 comprises generating the first arch line 602 based on the determined inner segmentation contour points 604. In other embodiments, instead of the first arch line 602 being based on the inner segmentation contour points 604, the first arch line 602 may be based on another predetermined reference point of the arch form 200, such as the midpoints between the first closest point and the second closest point.

The first arch line 602 extends transversely across the interdental gap 310. In some instances, the first arch line 602 extends transversely through the plurality of teeth 601 in the arch form 200 and extends across the interdental gap 310.

In some instances, the first arch line 602 extends substantially parallel to the gum line 325. In some instances, the first arch line 602 may be considered as substantially following a contour of the arch form 200 of the subject between a left side and a right side thereof. The first arch line 602 may comprise a polynomial curve.

Turning now to how the first arch line 602 is determined based on the determined inner segmentation contour points 604, in certain embodiments, the first arch line 602 is determined from the inner segmentation contour points 604 based on a predetermined rule. The predetermined rule may comprise a "best-fit" method such as a mathematical regression of the inner segmentation contour points 604. Other ways for best-fitting the points determined by the present methods may be used without departing from the present technology. In some instances, the first arch line 602 may be based on a Bezier curve using the determined inner segmentation contour points 604.

In certain embodiments, the first arch line 602 is determined by connecting the determined inner segmentation contour points 604 of the teeth 601 of the arch form 200.

Step 408: Generating a Second Arch Line

In some embodiments, step 408 comprises determining a second arch line 702 (see FIG. 8) based on a second reference point relative to the arch form 200. In this respect, the method 400 may comprise the processor 110 determining the second reference point, or a set of second reference points, from the 3D digital model 300, relative to the tooth or teeth of the arch form 200.

The second reference point may comprise an inner crown point 704 of at least one tooth 601 in the arch form 200. In certain embodiments, in determining the second arch line 702, the second reference point of a plurality of the teeth 601 in the arch form 200 are taken into account.

The inner crown point 704 may be based on a crown portion 703 of the given tooth 601, such as the crown portion 332 of the teeth 330 in the 3D digital model 300 of FIG. 3.

Figure 8:
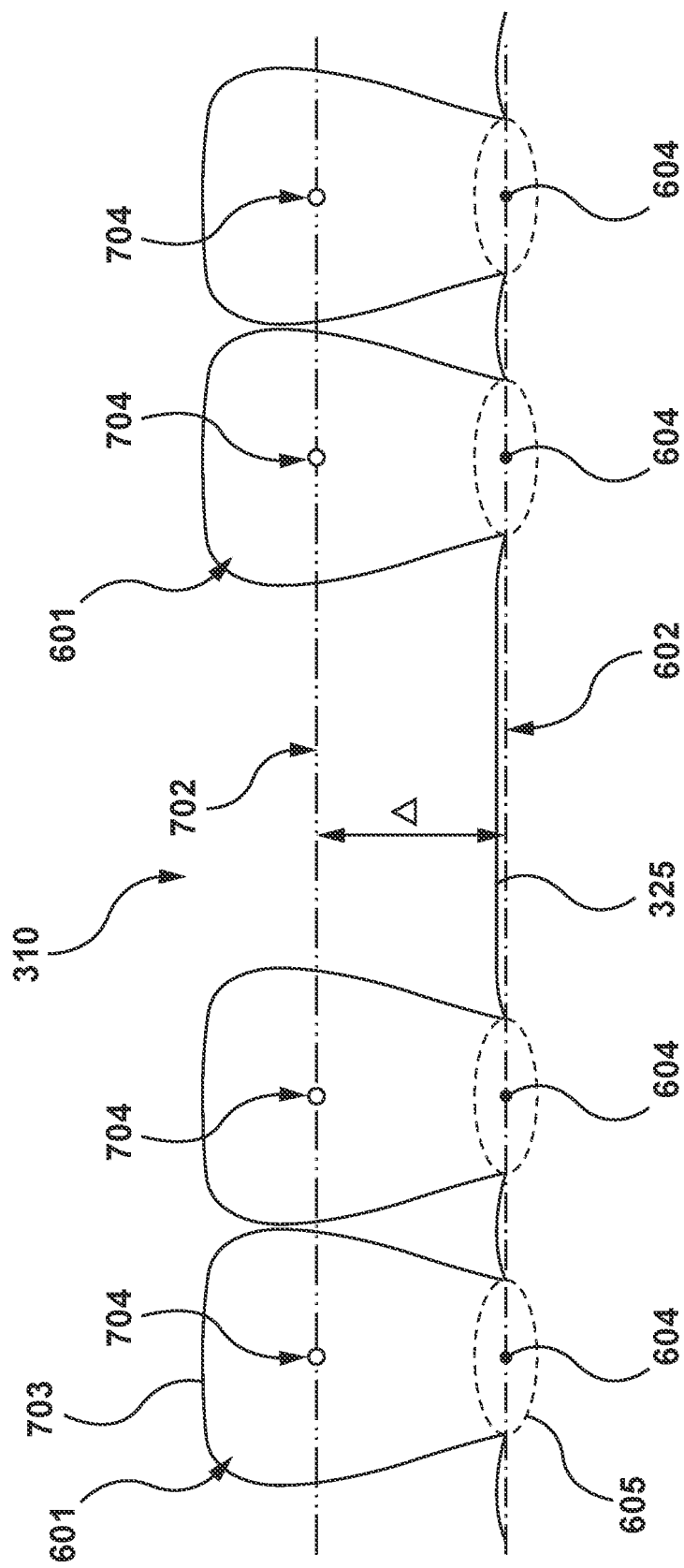
FIG. 8 depicts the 3D digital model of FIG. 7 and including a determined second arch line according to non-limiting embodiments of the present technology.

The inner crown point 704 may be a central point within the crown portion 703 of the tooth 601, or be based on any other predetermined rule or position relative to the crown portion 703 of the tooth 601. As shown in FIG. 8, in certain embodiments the inner crown point 704 of the tooth 601 of the arch form 200 is in a central position within a surface of the crown portion 703. The inner crown point 704 may also be referred to as an inner crown center 704.

In some embodiments, the inner crown point 704 is determined according to methods and/or systems described in co-owned U.S. Pat. No. 10,856,954 issued Dec. 8, 2020 and entitled "SYSTEMS AND METHODS FOR DETERMINING A TOOTH CENTER OF RESISTANCE", the contents of which are incorporated herein in their entirety. Briefly, the processor may be configured to: obtain a mesial point on a mesial side of the crown portion, and a distal point on a distal side of the crown portion; generate a mesiodistal line joining the mesial point and the distal point; identify the mesiodistal center as a midpoint on the mesiodistal line; determine a reference plane in the image data, the reference plane being perpendicular to the mesiodistal line and extending through the mesiodistal center; determine an intersection curve based on an intersection of the reference plane and the tooth mesh, the intersection curve following a shape of the surface of the crown portion at the reference plane; determine a tooth axis of the crown portion based on the intersection curve; determine a crown height of the crown portion based on the tooth axis; and determine the center of resistance of the tooth based on the determined crown height and the determined tooth axis.

In certain embodiments, the crown portion 703 of the given tooth 601 may be obtained by the processor 110, such as from the memory 130.

In certain embodiments, the method 400 at step 408 may comprise the processor 110 determining the crown portion 703 such as by segmenting, in the 3D digital model, one or more teeth of the arch form 200 from one or more other teeth of the arch form 200 to identify individual teeth 601 of the arch form 200.

In certain embodiments, the method 400 comprises segmenting the teeth 601 of the arch form 200 in order to determine their respective crown portions, according to methods and systems described in co-owned U.S. Pat. No. 10,695,147-B1 issued on Jun. 30, 2020, entitled "METHOD AND SYSTEM FOR DENTAL BOUNDARY DETERMINATION".

From the identified inner crown points 704 of the one or more of the teeth 601 of the arch form 200, as best seen in FIG. 8, the method 400 comprises generating the second arch line 702 based on the determined inner crown points 704. In other embodiments, instead of the second arch line 702 being based on inner crown points 704, the second arch line 702 may be based on another predetermined reference point of the arch form 200.

The second arch line 702 extends transversely across the interdental gap 310. In some instances, the second arch line 702 extends transversely through the plurality of teeth 601 in the 3D digital model 300 of the arch form 200 and extends across the interdental gap 310.

In some instances, the second arch line 702 extends substantially parallel to the gum line. In some instances, the second arch line 702 may be considered as substantially following a contour of the arch form 200 of the subject between a left side and a right side thereof. The second arch line 702 may comprise a polynomial curve.

Turning now to how the second arch line 702 is determined based on the determined inner crown points 704, in certain embodiments, the second arch line 702 is determined from the inner crown points 704 based on a predetermined rule. The predetermined rule may comprise a "best-fit" method such as a mathematical regression of the inner crown points 704. Other ways for best-fitting the points determined by the present methods may be used without departing from the present technology. In some instances, the second arch line 702 may be based on a Bezier curve using the determined inner crown points 704.

For example, in certain embodiments, the second arch line 702 is determined according to methods and/or systems described in co-owned US provisional application filed concurrently with the present application and entitled "SYSTEMS AND METHODS FOR DETERMINING A JAW CURVE", issued as U.S. Pat. No. 11,116,606 on Sep. 14, 2021, the contents of which are incorporated herein in their entirety.

Briefly, the processor 110 may be configured to project the inner crown points 704 or the inner segmentation contour points 604 of each tooth 601 onto a jaw plane which may be defined as being parallel to an X-Y plane of a tooth coordinate system of each tooth and/or a 3D digital model coordinate system. In one non-limiting example, the processor 110 may be configured to determine the coordinate systems such that the X-Y plane thereof is parallel to a transverse plane associated with a subject's skull (not depicted). In another example, the X-Y plane may be parallel to a Frankfort horizontal plane associated with the subject's cranium (not depicted). The inner crown points 704 of each tooth 601 may then be fitted to a curve to determine the second arch line 702. One or more anchor points, such as left and right anchor points, may be taken into account to aid in curve fitting the second arch line 702, where fitting the second arch line 702 includes fitting the anchor points and the inner crown points 704. The anchor points may be determined as a predetermined distance from one or more line segments projected in the jaw plane and extending through the inner crown points 704 or the inner segmentation contour points 604 of the rear-most, left and right teeth of the arch form. In some non-limiting examples, the predetermined distance could be about 15 millimeters. The second arch line 702 can then be determined by smoothing the line connecting the anchor points and the inner crown points 704 of each tooth 601. In some non-limiting implementations the fitting of the second arch line 702 is based on a parametrical Hermite spline H(t), and may include determining an average parametrical density for the second arch line 702.

In certain embodiments, the second arch line 702 is determined by connecting the determined inner crown points 704 of the teeth 601 of the arch form 200.

In some instances, the first arch line 602 and the second arch line 702 are spaced from one another, such as along a sagittal plane of the patient. The vertical distance or spacing between the first arch line 602 and the second arch line 702 is represented by the symbol for delta "A" in FIG. 8. In some instances, the delta between the first arch line 602 and the second arch line 702 in a given tooth 601 corresponds to a distance between the gum line and the inner crown point 704 in the crown portion 703 of the given tooth 601.

It is to be understood that in some other non-limiting embodiments, instead of the first arch line 602 and the second arch line 702 connecting inner segmentation contour points 604 and inner crown points 704 respectively, the first arch line 602 may be connecting the inner crown points 704 and the second arch line 702 may be connecting the inner segmentation contour points 604, without departing from the present technology.

Step 410: Generating Pairs of Intersection Points

Figure 9:
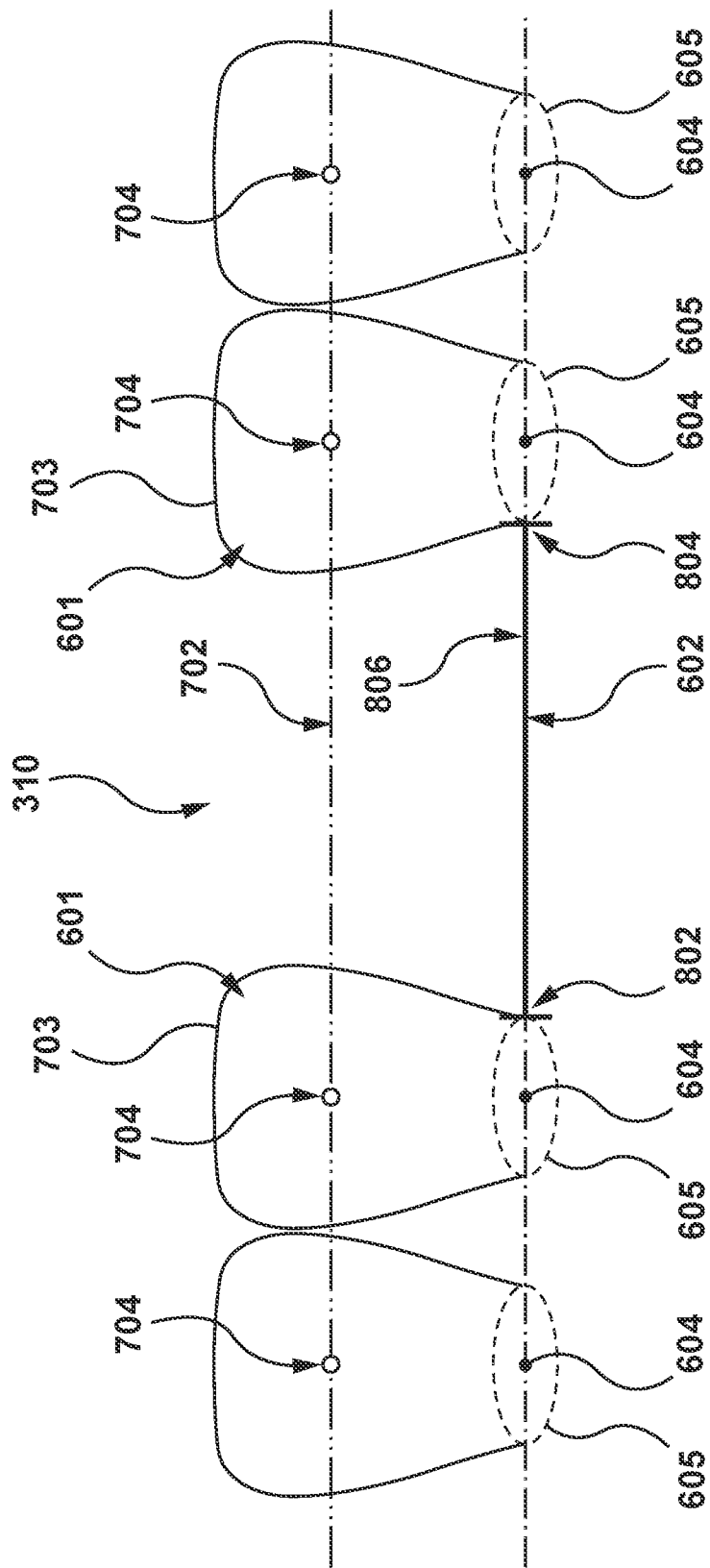
FIG. 9 depicts the 3D digital model of FIG. 8 and including a first interval of an interdental gap between two neighboring teeth according to non-limiting embodiments of the present technology.
Figure 10:
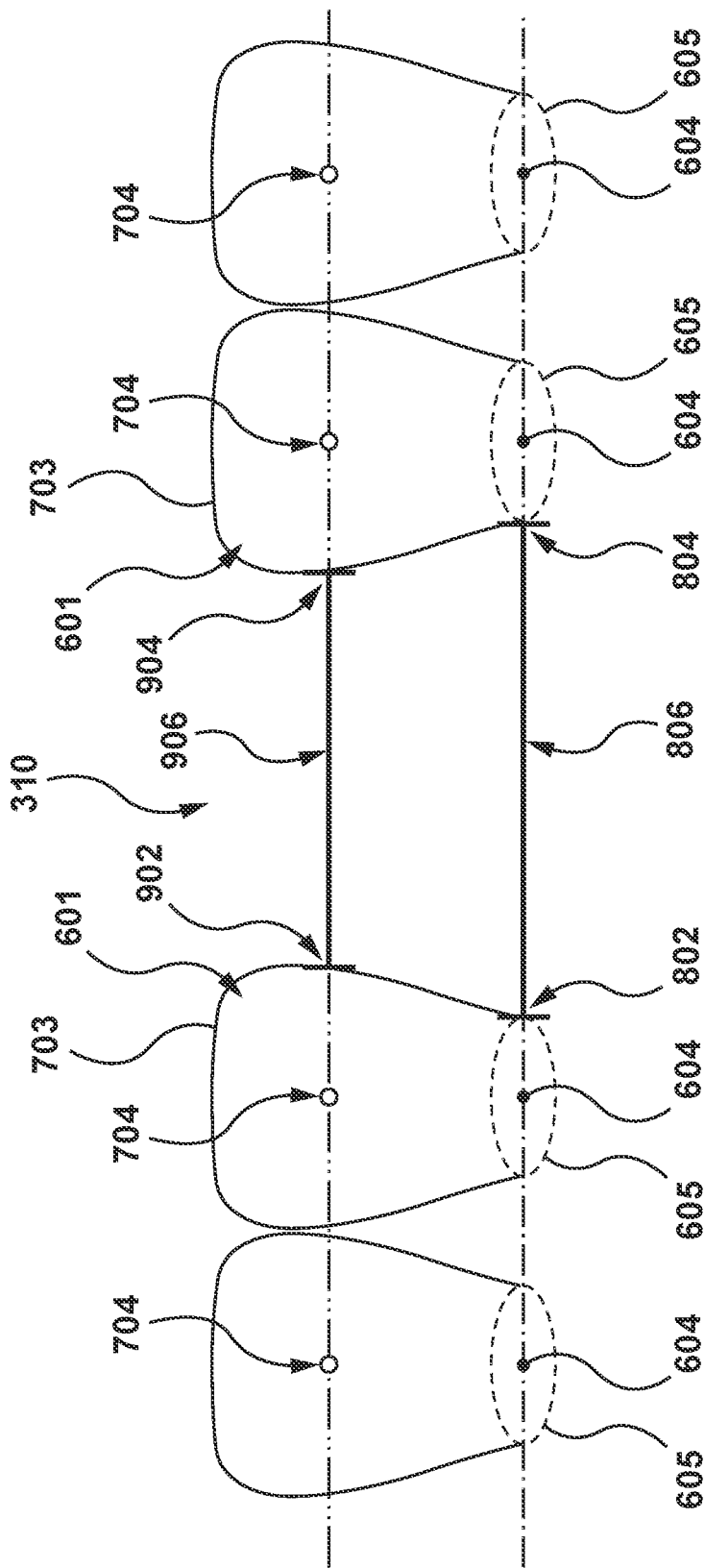
FIG. 10 depicts the 3D digital model of FIG. 9 and including a second interval of the interdental gap between two neighboring teeth according to non-limiting embodiments of the present technology.

In some embodiments, the method 400 further comprises step 410 for generating pairs of intersection points, one pair for each one of the arch lines 602, 702. Referring to FIG. 9, the first pair of intersection points are denoted with reference numerals 802, 804. Referring to FIG. 10, the second pair of intersection points are denoted with reference numerals 902, 904. Determining the first pair of intersection points 802, 804 comprises determining points on the crown portions 703 of the neighboring teeth 601 of the interdental gap 310 where the first arch line 602 intersects the crown portions 703 (as will be explained further below with reference to Step 412). Determining the second pair of intersection points 902, 904 comprises determining points on the crown portions 703 of the neighboring teeth 601 of the interdental gap 310 where the second arch line 702 intersects the crown portions 703 (as will be explained further below with reference to Step 414).

As can be seen, the first pair of intersection points 802, 804 are oppositely facing each other across the interdental gap 310 and the second pair of intersection points 902, 904 are also oppositely facing each other across the interdental gap 310.

The first pair of intersection points 802, 804 and the second pair of intersection points 902, 904 are spaced from one another, such as along a sagittal plane of the patient. The vertical distance or spacing between the first pair of intersection points 802, 804 and the second pair of intersection points 902, 904 corresponds to the distance delta between the first arch line 602 and the second arch line 702.

Step 412: Generating a First Pair of Intersection Points

At step 412, in certain embodiments, the processor 110 generates the first pair of intersection points 802, 804. As seen in FIG. 9, at the interdental gap 310 where it is desired to position the tooth structure, the first pair of intersection points 802, 804 is determined for the first arch line 602. The first pair of intersection points 802, 804 are determined using a predetermined rule which in some embodiments is an intersection of the first arch line 602 with the teeth neighboring the interdental gap 310. Intersection point 802 is determined at the intersection of the first arch line 602 and the segmentation contour 605 for one of the teeth neighboring the interdental gap 310. Intersection point 804 is determined at the intersection of the first arch line 602 and the segmentation contour 605 for the other tooth neighboring the interdental gap 310. In other embodiments, intersection point 802 is determined at the intersection of the first arch line 602 and the crown portion for one of the teeth neighboring the interdental gap 310, and intersection point 804 is determined at the intersection of the first arch line 602 and the crown portion for the other tooth neighboring the interdental gap 310. In some instances, points 802 and 804 in the first pair of intersection points are separated by the interdental gap 310 and are oppositely facing.

In some instances, intersection points 802 and 804 define a first interval 806 along the first arch line 602.

Various other methods may be used for determining intersection points 802 and 804. For example, they may be manually selected by a user.

Step 414: Generating a Second Pair of Intersection Points

At step 414, the method 400 comprises determining the second pair of intersection points 902, 904 (see FIG. 10).

The second pair of intersection points 902, 904 are determined using a predetermined rule which in some embodiments is an intersection of the second arch line 702 with the teeth neighboring the interdental gap 310. Intersection point 902 is determined at the intersection of the second arch line 702 and the crown portion for one of the teeth neighboring the interdental gap 310. Intersection point 904 is determined at the intersection of the second arch line 702 and the crown portion for the other tooth neighboring the interdental gap 310. In some instances, points 902 and 904 in the second pair of intersection points are separated by the interdental gap 310 and are oppositely facing.

In some instances, intersection points 902 and 904 define a second interval 906 along the second arch line 702.

Various other methods may be used for determining intersection points 902 and 904. For example, they may be manually selected by a user.

Step: 416: Determining Intermediate Points for the Intervals

In some embodiments, the method 400 comprises at step 416, the identification by the processor 110 of a first intermediate point in the gap between the first pair of intersection points (Step 418), and identifying a second intermediate point in the gap between the second pair of intersection points (Step 420). The first and second intermediate points being determined according to a predetermined rule, wherein a connection of the first intermediate point and the second intermediate point determine a desired position of a longitudinal axis of the tooth structure relative to the neighboring teeth.

Step 418: Determining a First Intermediate Point for the First Interval

Figure 11:
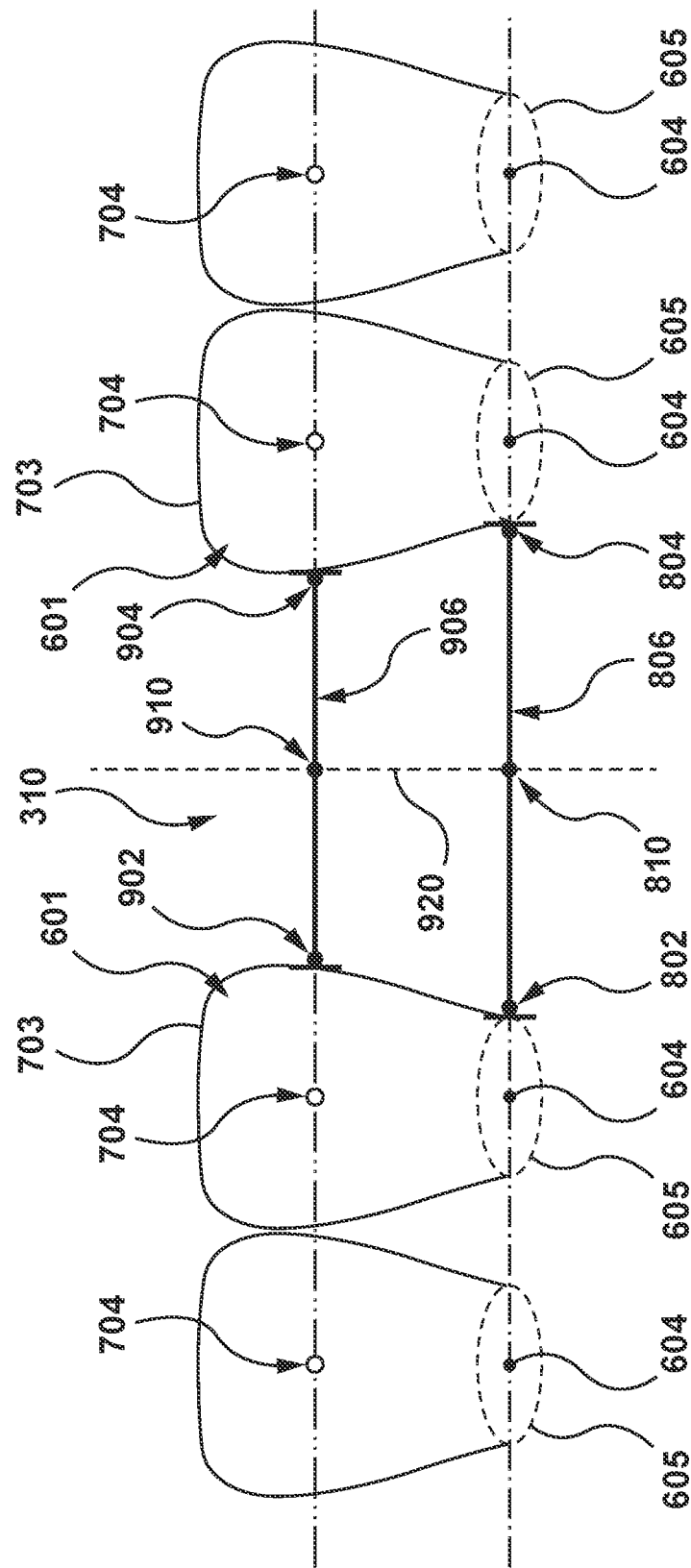
FIG. 11 depicts the 3D digital model of FIG. 10 and including a determined desired position of a longitudinal axis of the tooth structure according to non-limiting embodiments of the present technology.

In some non-limiting embodiments, and as best seen in FIG. 11, the processor 110 determines at step 418 a first intermediate point 810 for the first interval 806 defined by the first pair of intersection points 802, 804. The first intermediate point 810 may be determined using a predetermined rule. In some instances, the first intermediate point 810 represents a point in the interval 806 which is at mid-distance between intersection points 802 and 804. In some instances, the first intermediate point 810 may be positioned mid-distance between points 802 and 804 of the first pair of intersection points. In some other instances, the first intermediate point 810 may be positioned a third of the way from one intersection point to the other, or for example at a quarter of the way, or at a fifth of the way. In some instances, the first intermediate point 810 is along a straight line connecting the first pair of intersection points 802, 804. In other instances, the first intermediate point 810 is along the first arch line 602.

Step: 420: Determining a Second Intermediate Point for the Second Interval

In some non-limiting embodiments, and as seen in FIG. 11, the processor 110 determines the second intermediate point 910 for the second interval 906 defined by the second pair of intersection points 902, 904. The second intermediate point 910 may be determined using a predetermined rule.

In some instances, the second intermediate point 910 represents a point in the interval 906 which is at mid-distance between intersection points 902 and 904. In some instances, the second intermediate point 910 may be positioned mid-distance between intersection points 902 and 904. In some other instances, the second intermediate point 910 may be positioned a third of the way from one intersection point to the other, or for example at a quarter of the way, or at a fifth of the way.

In some instances, the second intermediate point 910 is along a straight line connecting the second pair of intersection points 902, 904. In other instances, the second intermediate point 910 is along the second arch line 702.

Step 422: Determining a Desired Position of a Longitudinal Axis for the Tooth Structure In some non-limiting embodiments, at step 422, the method 400 comprises the processor 110 determining the desired position of a longitudinal axis 920 for the tooth structure based on the determined first intermediate point 810 and the second intermediate point 910. In certain embodiments, the determining the desired position of the longitudinal axis 920 for the tooth structure comprises connecting the first intermediate point 810 and the second intermediate point 910.

In some instances, once the Mesial-Distal direction for the tooth structure lies tangential to one or both of the first arch line 602 and the second arch line 702.

The determined desired position of the longitudinal axis 920 for the tooth structure is positioned in the interdental gap 310 between the neighboring teeth 601. It represents an eventual positioning of the tooth structure in the interdental gap 310.

In some other embodiments, the desired position of a longitudinal axis for the tooth structure 920 is determined using another predetermined rule based on another reference point such as the second pair of intersection points 902, 904, or the first pair of intersection points 802, 804.

Step 424: Obtaining a Digital Model of the Tooth Structure

Figure 12:
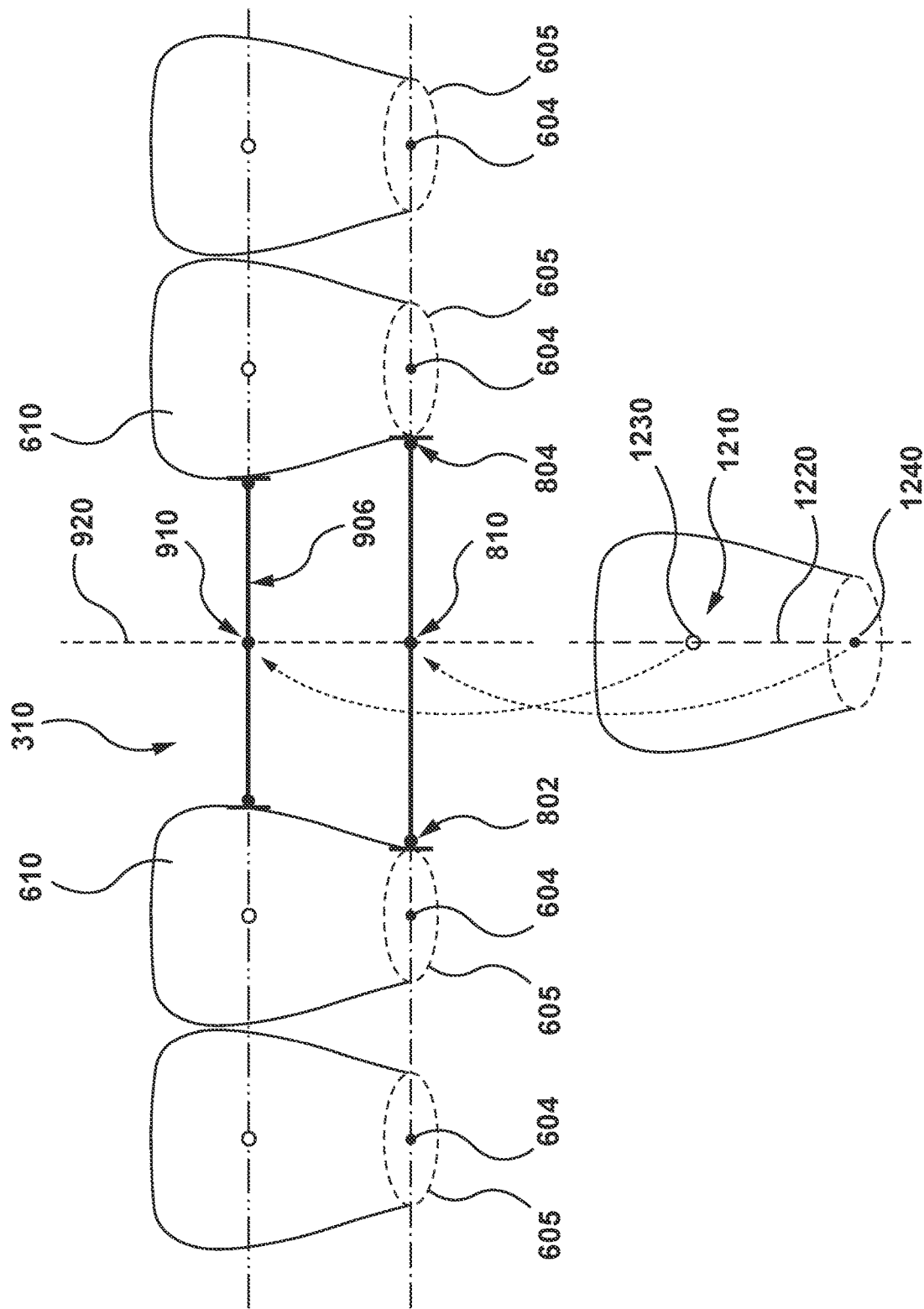
FIG. 12 depicts the 3D digital model of FIG. 11 and showing a placement of a digital model of the tooth structure along the determined desired position of the tooth structure longitudinal axis according to non-limiting embodiments of the present technology.

With reference to FIG. 12, in some embodiments, method 400 comprises a step 424 of obtaining a 3D digital model of a template tooth structure 1210. Step 424 comprises placing the 3D digital model of the template tooth structure 1210 into the interdental gap 310 and aligning the template tooth structure 1210 with the desired position of the longitudinal axis 920 determined at step 422.

In some instances, the template tooth structure 1210 is based on a 3D digital model of a tooth of the patient. In some other instances, the template tooth structure 1210 is based on a template obtained from a library of template 3D digital models of tooth structures.

In some embodiments, the template tooth structure 1210 is a template pontic.

In some instances, the template tooth structure may be based on determining an identity of a missing or incomplete tooth of the interdental gap 310 and obtaining a 3D digital model of a tooth with the same identity e.g. canine tooth or molar tooth.

In some instances, the template tooth structure may be based on matching, such as in size, shape or configuration, to the neighboring teeth 610 of the patient around the interdental gap 310.

The aligning the template tooth structure 1210 within the interdental gap 310 may comprise positioning the template tooth structure 1210 in the interdental gap 310 between the neighboring teeth 610 such that a longitudinal axis 1220 of the template tooth structure 1210 is substantially aligned with the determined desired position of the longitudinal axis 920 of the tooth structure. The longitudinal axis 1220 of the template tooth structure may have been obtained by the processor 110 or otherwise previously determined.

In certain embodiments, instead of, or in addition to positioning the template tooth structure 1210 based on the longitudinal axis 1220 of the template tooth structure, the positioning may be based on aligning a tooth structure inner crown point 1230 of the template tooth structure 1210 with the second intermediate point 910, and a tooth structure inner segmentation contour point 1240 of the template tooth structure 1210 with the first intermediate point 810.

In certain embodiments, the processor 110 obtains the tooth structure inner crown point 1230 of the tooth structure template 1210 from a memory such as the memory 130.

In certain embodiments, the processor 110 determines the tooth structure inner crown point 1230 of the tooth structure template 1210, such as using embodiments of the method used to determine the inner crown point 704 of the given tooth 601. In certain instances, the determining the tooth structure inner crown point 1230 of the tooth structure template 1210 comprises determining a central point within a crown portion of the tooth structure template.

In certain embodiments, the processor 110 obtains the tooth structure inner segmentation contour point 1240 of the tooth structure template 1210 from a memory such as the memory 130.

In certain embodiments, the processor 110 determines the tooth structure inner segmentation contour point 1240 of the tooth structure template 1210, such as using embodiments of the method used to determine the inner segmentation contour point 604 of the given tooth 601. In certain instances, the determining the tooth structure inner segmentation contour point 1240 comprises determining a central point within a segmentation contour of the template tooth structure.

In certain embodiments, the processor 110 may select a tooth structure surface geometry given a previously identified or manually updated positions/orientation and the space available between neighboring teeth.

In some embodiments, the 3D digital model of the template tooth structure is determined using predetermined rules. The predetermined rules for determining the digital model of the tooth structure include a tooth type, a patient age, a patient tooth type corresponding to a missing or incomplete tooth of the interdental gap, and the like.

Step 426: Scaling of the Obtained Digital Model of the Tooth Structure

At Step 426, the processor 110 determines if the template tooth structure 1210 requires scaling in the interdental gap to achieve a desired size. The desired size may be based on a size of the neighboring teeth 610 and/or a size which is determined to avoid or minimize intersection with neighboring teeth. In some instances, the term "scaling" as used herein, refers to re-sizing.

In some embodiments, it may be determined that the template tooth structure is already at the desired size for the patient's interdental gap 310. In such embodiments, scaling ore re-sizing of the template tooth structure is not required.

In some embodiments, it may be determined that the template tooth structure is not at the desired size and therefore requires re-sizing. In such embodiments, the method 400 comprises re-sizing the template tooth structure.

The determination of whether the template tooth structure requires re-sizing or not can be performed by the processor 110 as part of the method 400 or determined manually for example.

In certain embodiments, the method 400 comprises determining that the tooth structure template 1210 requires scaling if, for example, after aligning the longitudinal axis 1220 of the template tooth structure 1210 with the determined desired position of a longitudinal axis 920 in the interdental gap 310, the tooth structure inner crown point 1230 of the template tooth structure 1210 is not aligned with the second intermediate point 910.

In certain embodiments, the method 400 comprises determining that the tooth structure template 1210 requires scaling if, for example, after aligning the longitudinal axis 1220 of the template tooth structure 1210 with the determined desired position of a longitudinal axis 920 in the interdental gap 310, the tooth structure inner segmentation contour point 1240 of the template tooth structure 1210 is not aligned with the first intermediate point 810.

In certain embodiments, the method 400 comprises determining that the tooth structure template 1210 does not require scaling when, after aligning the longitudinal axis 1220 of the template tooth structure 1210 with the determined desired position of a longitudinal axis 920 in the interdental gap 310, the tooth structure inner crown point 1230 of the template tooth structure 1210 is aligned with the second intermediate point 910, and the tooth structure inner segmentation contour point 1240 of the template tooth structure 1210 is aligned with the first intermediate point 810.

In certain embodiments, if not already performed in Step 424, the method 400 comprises obtaining the tooth structure inner crown point 1230 of the tooth structure template 1210 from a memory such as the memory 130.

In certain embodiments, if not already performed in Step 424, the processor 110 determines the tooth structure inner crown point 1230 of the tooth structure template 1210, such as using embodiments of the method used to determine the inner crown point 704 of the given tooth 601. In certain instances, the determining the tooth structure inner crown point 1230 of the tooth structure template 1210 comprises determining a central point within a crown portion of the tooth structure template.

In certain embodiments, if not already performed in Step 424, the processor 110 obtains the tooth structure inner segmentation contour point 1240 of the tooth structure template 1210 from a memory such as the memory 130.

In certain embodiments, if not already performed in Step 424, the processor 110 determines the tooth structure inner segmentation contour point 1240 of the tooth structure template 1210, such as using embodiments of the method used to determine the inner segmentation contour point 604 of the given tooth 601. In certain instances, the determining the tooth structure inner segmentation contour point 1240 comprises determining a central point within a segmentation contour of the template tooth structure.

Turning now to how the re-sizing is performed once a determination is made that the template tooth structure 1210 requires re-sizing. In certain embodiments, the method 400 may comprise the processor 110 re-sizing the 3D digital model of the template tooth structure 1210 along one, two or three axes until the desired size is reached.

For example, the template tooth structure may be re-sized along one axis until the tooth structure inner crown point 1230 of the template tooth structure 1210 is aligned with the second intermediate point 910, and the tooth structure inner segmentation contour point 1240 of the template tooth structure 1210 is aligned with the first intermediate point 810.

In some instances, the processor 110 may re-size the template tooth structure 1210 along two axes until the desired size is reached.

In some instances, the processor 110 may re-size the template tooth structure 1210 along three axes until the desired size is reached.

Figure 13:
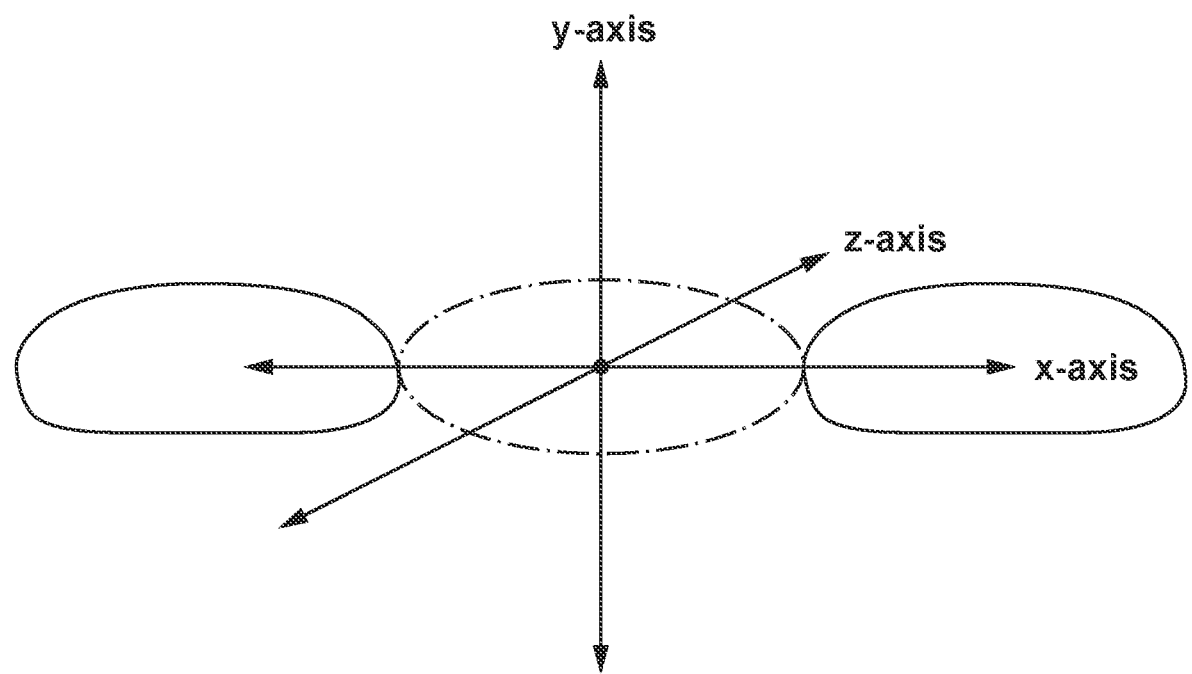
FIG. 13 depicts a close-up of two neighboring teeth and an interdental gap of the 3D digital model of FIG. 6, wherein scaling axes along the x-axis, the y-axis and the z-axis have been identified according to non-limiting embodiments of the present technology.

The axes along which the scaling of the tooth structure template is performed may be one or more of: x-axis in the mesial and distal directions, the y-axis in the buccal and lingual directions and the z-axis in the occlusal and gingival (vertical) directions. FIG. 13 shows examples of scaling axes along which the tooth structure template 1210 may be scaled. For example, scaling of the tooth structure template 1210 may performed along two axes independently such as the x-axis direction and the y-axis direction, or such as the x-axis direction and the z-axis direction, or in the y-axis direction and in the z-direction In some instances, scaling of the tooth structure template 1210 may be performed along the three axes independently.

In certain embodiments, the method 400 comprises the processor 110 causing display of the template tooth structure 1210 during its re-sizing.

Once the tooth structure template is scaled to the desired size, the scaled tooth structure template 1210 may be determined as being the digital model of the tooth structure.

The method 400 may further comprise updating the 3D digital model of the arch form 200 to include the so determined digital model of the tooth structure.

The method 400 may further comprise saving the so determined digital model of the tooth structure in a memory such as the memory 130 of the computer system.

Therefore, in certain embodiments, the digital tooth structure is determined using embodiments of the present method 400 based on determining an alignment of the eventual tooth structure in the interdental gap 310 and a scaling of the template tooth structure 1210. In some non-limiting embodiments, axes of neighboring teeth are not determined and/or not taken into consideration in the step of aligning or scaling the tooth structure template 1210. That is to say that in some embodiments, the method of the present technology does not account for axes of teeth neighboring the interdental gap. This can present a leaner resource intensive manner of determining the digital tooth structure model.

In embodiments where scaling of the obtained digital model of the tooth structure was not required, the 3D digital model of the arch form may be updated to include the digital model of the tooth structure without scaling.

Step 428: Displaying the Obtained Digital Model of the Tooth Structure

In some non-limiting embodiments, the method 400 further comprises the processor 110 causing the so determined digital model of the tooth structure to be displayed on a display, such as the touchscreen 190. In some instances, the obtained digital model of the tooth structure may be displayed on its own or may be overlayed on the 3D digital model of the arch form 200 and positioned between the neighboring teeth 601 of the 3D digital model of the arch form 200 of the patient.

In some non-limiting embodiments, the processor 110 causes the obtained digital model of the tooth structure to be stored in a memory of the computer system, such as the memory 130.

Developing an Orthodontic Treatment Plan Based on the Obtained Digital Model of the Tooth Structure In some non-limiting embodiments, the method 400 of the present technology may further comprise developing an orthodontic treatment plan which is based on the obtained digital model of the tooth structure. In some instances, the orthodontic treatment plan takes into account positioning of the tooth structure between the neighbouring teeth of the interdental gap of the arch form of the patient.

In the instances where the size of the interdental gap is larger than a predetermined threshold, the orthodontic treatment plan may involve adjusting the interdental gap between teeth in a 3D digital model of the teeth (e.g., reducing or increasing the size of the interdental gap) and positioning the obtained digital model of the tooth structure in a gap between teeth using methods and techniques known to those skilled in the art.

Manufacture of a Tooth Structure

According to certain non-limiting embodiments of the present technology, the processor 110 may be configured to cause manufacturing of an actual physical tooth structure based on the obtained digital model of the tooth structure. The actual physical tooth structure may be manufactured as a stand-alone orthodontic appliance, or the actual physical tooth structure may be integrated within another orthodontic appliance. For example, the actual physical tooth structure may be formed as part of an aligner. If the actual physical tooth structure is formed as part of an orthodontic appliance, the obtained digital model of the tooth structure may be merged with a model of the orthodontic appliance. The obtained digital model of the tooth structure may be used for further modeling, such as to determine aligner thickness after thermoforming.

In additional non-limiting embodiments of the present technology, the superimposed 3D digital model of the arch form 200 and the obtained digital model of the tooth structure may be used for producing the mold of the patient's arch form representative of the desired configuration thereof; and the processor 110 may be configured to cause manufacturing the aligner based on the mold. As a result, portions of the aligner thus produced associated with the interdental gap may extend, between the first tooth 305 and the second tooth 315, over the patient's gingiva, when the aligner is worn over the patient's teeth, and may thus avoid additional discomfort to the patient.

In some non-limiting embodiments of the present technology, the actual physical tooth structure may be manufactured of one of the above-listed materials using 3D printing techniques where the actual physical tooth structure is printed by a 3D printer. In other non-limiting embodiments of the present technology, the actual physical tooth structure may be produced by a thermoforming process.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting.

The invention claimed is:

1. A method for generating a digital tooth structure for a gap between neighboring teeth of an arch form of a patient, the method executable by a processor of a computer system, the method comprising:
    obtaining a 3D digital model of the arch form of the patient, the arch form comprising a plurality of teeth including the neighboring teeth, wherein the 3D digital model represents an outer geometry of crown portions of the plurality of teeth;
    determining a positioning of a tooth structure in the gap between the neighboring teeth, the determining the positioning of the tooth structure comprising:
        generating a first arch line and a second arch line extending transversely through the plurality of teeth of the arch form, the first arch line and the second arch line being spaced from one another for extending therethrough a longitudinal axis of the tooth structure within the gap between the neighboring teeth;
            for the first arch line, determining a first pair of intersection points of the first arch line with the neighboring teeth, the first pair of intersection points being oppositely facing;
            for the second arch line, determining a second pair of intersection points of the second arch line with the neighboring teeth, the second pair of intersection points being oppositely facing;
        determining a desired position of the longitudinal axis of the tooth structure relative to the neighboring teeth, the determining comprising:
            identifying, along the first arch line, a first intermediate point in the gap between the first pair of intersection points;
            identifying, along the second arch line, a second intermediate point in the gap between the second pair of intersection points,
                the first and second intermediate points being determined according to a predetermined rule; and
            determining the desired position of the longitudinal axis as extending through the first intermediate point and the second intermediate point;
    obtaining a 3D digital model of a template tooth structure from a database and positioning the 3D digital model of the template tooth structure between the neighboring teeth such that a longitudinal axis of the 3D digital model is aligned with the determined desired position of the longitudinal axis, and determining the positioned template tooth structure as the digital tooth structure; and
    storing the digital tooth structure in a memory of the computer system.

2. The method of claim 1, wherein generating the first arch line comprises:
    for each tooth of the plurality of teeth of the arch form, obtaining a segmentation contour representing a boundary of the tooth and adjacent gingiva;
    for each tooth of the plurality of teeth of the arch form, determining an inner segmentation contour point within each given segmentation contour based on a predetermined rule;
    generating the first arch line based on the determined inner segmentation contour points of the plurality of teeth of the arch form.

3. The method of claim 2, wherein the generating the first arch line comprises generating a polynomial curve which is based on the determined inner segmentation contour points and a mathematical regression.

4. The method of claim 2, wherein the predetermined rule for determining the inner segmentation contour point comprises determining a central position within the segmentation contour of the given tooth.

5. The method of claim 1, wherein generating the second arch line comprises:
    for each tooth of the plurality of teeth of the arch form, determining an inner crown point within the crown portion of the given tooth based on a predetermined rule;

generating the second arch line based on the determined inner crown points of the plurality of teeth of the arch form.

6. The method of claim 5, wherein the generating the second arch line comprises generating a polynomial curve based on the determined inner crown points and a mathematical regression.

7. The method of claim 5, wherein the predetermined rule for determining the inner crown point comprises determining a central position within the outer geometry of the given crown portion.

8. The method of claim 1, wherein the predetermined rule for determining the first and second intermediate points of the first and second pair of intersection points comprises determining a mid point between the first and second pair of intersection points, respectively.

9. The method of claim 8, wherein the mid point between the first pair of intersection points is along a straight line connecting the first pair of intersection points, and the mid point between the second pair of intersection points is along a straight line connecting the second pair of intersection points.

10. The method of claim 1, further comprising determining that the digital model of the tooth structure requires scaling if:
an inner crown point of a crown portion of the digital tooth structure is not aligned with an intersection of the second arch line and the desired position of the longitudinal axis, the inner crown point having been determined based on a predetermined rule.

11. The method of claim 10, wherein, if there is a determination that the digital model of the tooth structure requires scaling, the method further comprises scaling the digital model of the tooth structure by:
re-sizing the tooth structure along one axis to map the inner crown point of the tooth structure with the intersection of the second arch line and the desired position of the longitudinal axis.

12. The method of claim 1, further comprising determining that the digital model of the tooth structure requires scaling if:
an inner segmentation contour point of the digital tooth structure is not aligned with an intersection of the first arch line and the desired position of the longitudinal axis, the inner segmentation contour point having been determined based on a predetermined rule.

13. The method of claim 12, wherein, if there is a determination that the digital model of the tooth structure requires scaling, the method further comprises scaling the digital model of the tooth structure by:
re-sizing the tooth structure along one axis to map the inner segmentation contour point of the tooth structure onto an intersection of the first arch line and the desired position of the longitudinal axis.

14. The method of claim 1, further comprising scaling the digital model of the tooth structure, the digital model of the tooth structure comprising a crown portion and a segmentation contour, the scaling comprising:
re-sizing the tooth structure along a first axis to map an inner crown point of the tooth structure onto an intersection of the second arch line and the desired position of the longitudinal axis, the inner crown point having been determined based on a predetermined rule;
re-sizing the tooth structure along a second axis to map an inner segmentation contour point of the tooth structure onto the first arch line and the desired position of the longitudinal axis, the inner segmentation contour point having been determined based on a predetermined rule.

15. The method of claim 1, further comprising:
scaling the digital model of the tooth structure, the digital model of the tooth structure comprising a crown portion and a segmentation contour, the scaling comprising: re-sizing the tooth structure independently along two axes and mapping into the gap based on the first arch line, the second arch line and the desired position of the longitudinal axis, without taking into account longitudinal axes of the neighboring teeth; and
displaying the scaled digital model of the tooth structure.

16. The method of claim 1, wherein the tooth structure is a pontic.

17. A system for generating a digital tooth structure for a gap between neighboring teeth of an arch form of a patient, the system comprising a computer system having a processor, the processor configured to execute a method comprising:
obtaining a 3D digital model of the arch form of the patient, the arch form comprising a plurality of teeth including the neighboring teeth, wherein the 3D digital model represents an outer geometry of crown portions of the plurality of teeth;
determining a positioning of a tooth structure between the neighboring teeth, the determining the positioning of the tooth structure comprising:
generating a first arch line and a second arch line extending transversely through the plurality of teeth of the arch form, the first arch line and the second arch line being vertically spaced from one another for extending therethrough a longitudinal axis of the tooth structure within the gap between the neighboring teeth;
for the first arch line, determining a first pair of intersection points of the first arch line with the neighboring teeth, the first pair of intersection points being oppositely facing;
for the second arch line, determining a second pair of intersection points of the second arch line with the neighboring teeth, the second pair of intersection points being oppositely facing;
determining a desired position of the longitudinal axis of the tooth structure relative to the neighboring teeth, the determining comprising:
identifying, along the first arch line, a first intermediate point in the gap between the first pair of intersection points;
identifying, along the second arch line, a second intermediate point in the gap between the second pair of intersection points,
the first and second intermediate points being determined according to a predetermined rule; and
determining the desired position of the longitudinal axis as extending through the first intermediate point and the second intermediate point;
obtaining a digital model of the tooth structure from a database and positioning the digital model of the tooth structure between the neighboring teeth such that a longitudinal axis of the digital model is aligned with the determined desired position of the longitudinal axis.

18. The system of claim 17, wherein the processor is configured to scale the digital model of the tooth structure, the digital model of the tooth structure comprising a tooth structure crown and a tooth structure segmentation contour, the scaling comprising: re-sizing the tooth structure independently along two axes and mapping into the gap based on the first arch line, the second arch line and the desired position of the longitudinal axis, without taking into account longitudinal axes of the neighboring teeth.

19. The system of claim 17, wherein:
the first arch line is generated based on inner segmentation contour points of the plurality of teeth of the arch form, each inner segmentation contour point of each tooth of the plurality of teeth being a central point within a segmentation contour representing a boundary of the tooth and adjacent gingiva, and
the second arch line is generated based on inner crown points of the plurality of teeth of the arch form, each inner crown point of each tooth of the plurality of teeth being a central point within the crown portion of the given tooth.

20. A method for generating a digital tooth structure for a gap between neighboring teeth of an arch form of a patient, the method executable by a processor of a computer system, the method comprising:
obtaining a 3D digital model of the arch form of the patient, the arch form comprising a plurality of teeth including the neighboring teeth, wherein the 3D digital model represents an outer geometry of crown portions of the plurality of teeth;
determining a desired position for the tooth structure, the determining the desired position comprising determining a desired position of a longitudinal axis of the tooth structure in between the neighboring teeth by:
generating a first arch line and a second arch line extending transversely through the plurality of teeth of the arch form, the first arch line and the second arch line being vertically spaced from one another for extending therethrough the longitudinal axis of the tooth structure within the gap between the neighboring teeth;
identifying, along the first arch line, a first intermediate point in the gap between the neighboring teeth;
identifying, along the second arch line, a second intermediate point in the gap between the neighboring teeth,
the first and second intermediate points being determined according to a predetermined rule; and
determining the desired position of the longitudinal axis as extending through the first intermediate point and the second intermediate point;
obtaining a digital model of the tooth structure from a database and positioning the digital model of the tooth structure between the neighboring teeth such that a longitudinal axis of the digital model is aligned with the obtained desired position of the longitudinal axis;
scaling the digital model of the tooth structure, the digital model of the tooth structure comprising a crown portion and a segmentation contour, the scaling comprising:
re-sizing the tooth structure independently along two axes, the scaling being based on aligning a reference point of the tooth structure with one or more of a first arch line, a second arch line and the desired position of the longitudinal axis, wherein the first arch line and the second arch line extend transversely through the plurality of teeth of the arch form including the neighboring teeth; and
storing the scaled digital model of the tooth structure in a memory of the computer system.

* * * * *